(12) United States Patent
Sato

(10) Patent No.: US 6,467,910 B1
(45) Date of Patent: Oct. 22, 2002

(54) IMAGE PROJECTOR

(75) Inventor: Yoshihisa Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 127 days.

(21) Appl. No.: 09/597,864

(22) Filed: Jun. 20, 2000

(30) Foreign Application Priority Data

Jun. 21, 1999 (JP) ............................................ 11-173892
Jun. 21, 1999 (JP) ............................................ 11-173894

(51) Int. Cl.[7] ............................................ G03B 21/14
(52) U.S. Cl. ............................ 353/84; 353/31; 348/743
(58) Field of Search .............................. 353/20, 31, 34, 353/37, 84; 348/742, 743, 771; 359/887, 891

(56) References Cited

U.S. PATENT DOCUMENTS

| | | | | |
|---|---|---|---|---|
| 5,371,543 A | * | 12/1994 | Anderson | 348/743 |
| 5,863,125 A | * | 1/1999 | Doany | 353/84 |
| 5,921,650 A | * | 7/1999 | Doany et al. | 353/31 |
| 6,266,105 B1 | * | 7/2001 | Gleckman | 348/743 |

* cited by examiner

*Primary Examiner*—William Dowling
(74) *Attorney, Agent, or Firm*—Frommer Lawrence & Haug LLP; William S. Frommer

(57) ABSTRACT

White light L11 emitted from a white light source 11 is split into R, G, B effective light beams L12 and reflected in an opposite direction with respect to the white light source 11 by a reflection type color wheel 17. The beams strike a spatial light modulator where they are modulated to R, G, B optical images L13, and the images are projected to a screen by a projection lens 18. Consequently, the diameter of the color wheel can be made larger without increasing the overall height of the apparatus. Further, unwanted light L14 transmitted through the reflection type color wheel 17 is prevented from causing heating or is transformed to electricity by a solar battery etc.

20 Claims, 27 Drawing Sheets

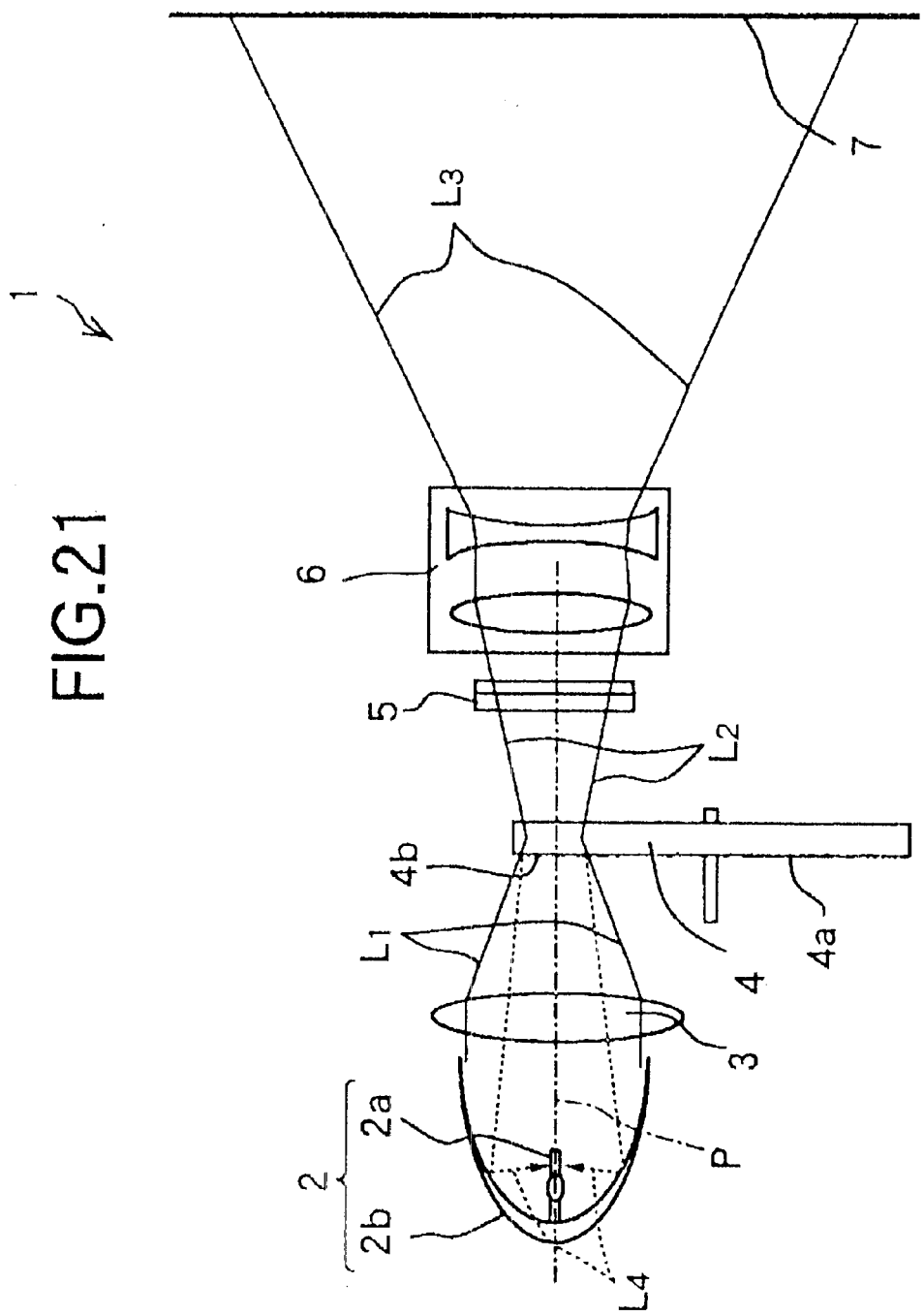

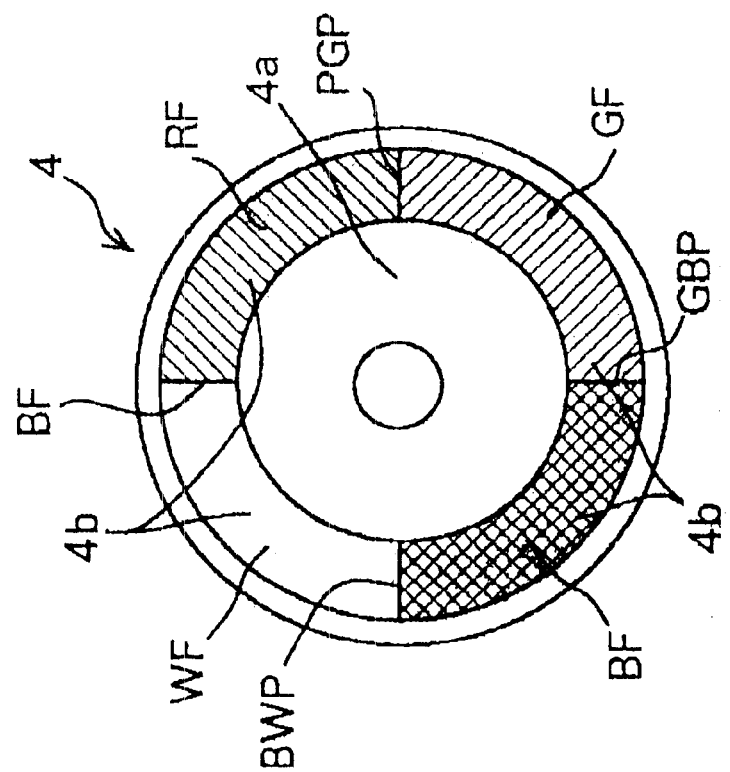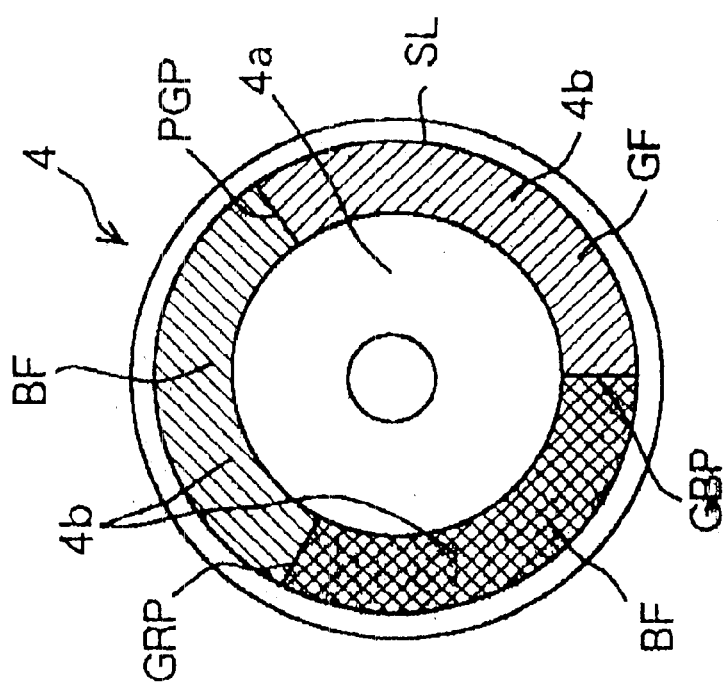

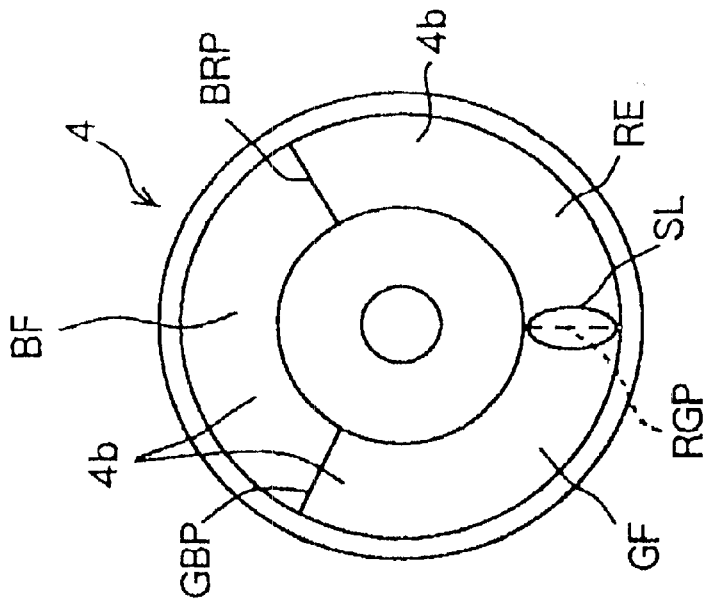
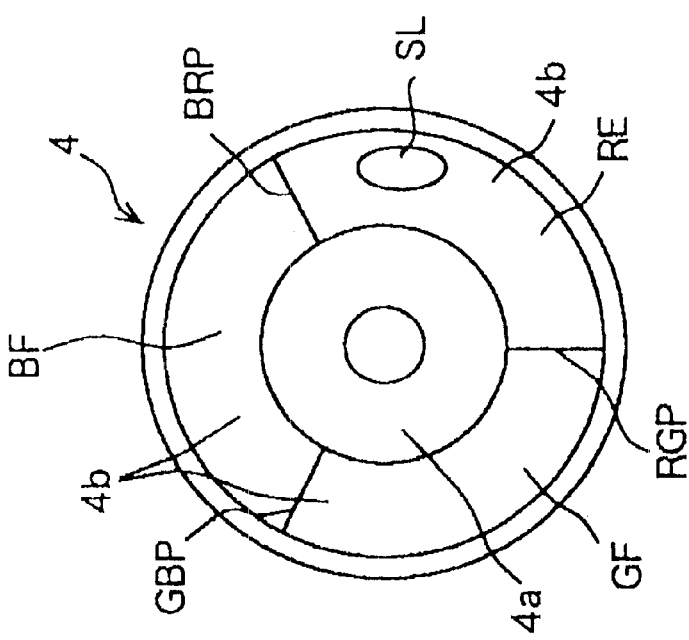

IMAGE PROJECTOR

BACKGROUND OF THE INVENTION

1. Field of the Invention

The present invention relates to an image projector which is optimum for application to a projector projecting a color image on a screen etc., more particularly relates to an image projector using a color wheel to split white light emitted from a light source into effective light beams of the R (red), G (green), B (blue), and other wavelength bands shifted by time, modulating the split R, G, and B effective light beams by a liquid crystal panel, digital micro-mirror device (DMD), or other spatial light modulator, and projecting them on a screen etc.

2. Description of the Related Art

Conventionally, this kind of image projector may be roughly divided into two systems. The first system of such an image projector uses three R (red light), G (green light), and B (blue light) liquid crystal panels, DMDS, or other spatial light modulators. It passes the white light emitted from a light source through three R, G, and B diohromic mirrors to split it into R, G, and B effective light beams which it then guides to three spatial light modulators, drives the three spatial light modulators, combines the three R, G, and B optical images obtained by modulation by the three spatial light modulators by a prism system, and projects the result on a screen etc.

Next, as shown in FIG. 21, the second system of such an image projector, shown by reference numeral 1, comprises a white light source 2 comprised by a discharge lamp 2a, a reflection mirror (reflector) 2b, etc. and a condenser lens 3, a transmission type color wheel 4, and a single spatial light modulator 5 arranged in series on an horizontal optical axis P of white light L1 emitted from the light source 2. As shown in FIG. 22A, the transmission type color wheel 4 has formed around the periphery of its wheel surface 4a red filter RF, a green filter GF, and a blue filter BF comprised by R, G, and B color filters 4b dividing the outer periphery into three sections. Note that, as shown in FIG. 22B, there is also a transmission type color wheel 4 with a white filter WF provided in addition to the color filters 4b to thereby divide the outer periphery into four and improve the luminance.

Returning to FIG. 21, the transmission type color wheel 4 is arranged perpendicular to the optical axis P of the white light L1 emitted from the white light source 2. The transmission type color wheel 4 is rotated at a high speed (10 s to 100 s of revolutions per second) by a driving means (not shown). The white light L1 emitted from the white light source 2 strikes rotating positions of the red filter RF, green filter GF, and blue filter BF of the color filters 4b of the transmission type color wheel 4 perpendicularly and passes through the red filter RF, green filter GF, and blue filter BF. As a result, the white light L1 is split into R, G, B, and other effective light beams L2 shifted by time by the transmission type color wheel 4. The effective light beams L2 strike the spatial light modulator 5 at different times. The spatial light modulator 5 modulates the effective light beams L2 to three R, G, and B(W) optical images L3 (and white light for improving the luminance) shifted by time by applying R, G, and B image signals (and a signal for improving the luminance) in synchronization with the time the three or four R, G, and B(W) effective light beams L2 strike it and emit those optical images L3. At this time, the three R, G, and B optical images L3 (and white light for improving the luminance) can be viewed by the human eye superimposed, so the optical images L3 are projected by a projection lens 6 on a screen 7 etc. to thereby project a full color image.

Summarizing the problems to be solved by the invention, the first system of image projector using three spatial light modulators and dichromic mirrors suffers from the problem of the large number of parts and a difficulty in space saving, so is not suitable for compact projectors.

The second system of image projector 1 using the transmission type color wheel 4 and the single spatial light modulator 5 as shown in FIG. 21 has the problem that it is difficult to reduce the height of the overall apparatus.

That is, as shown in FIG. 23, when using the transmission type color wheel 4, the cross-sectional area of the spot SL of the white light L1 striking the transmission type color wheel 4 must be made sufficiently small with respect to the diameter of the transmission type color wheel 4. At the instant the spot of light SL passes a dividing point RGP, GBP, or BRP of the red filter RF, green filter GF, and blue filter BF, two colors of effective light end up to be mixed. If the spatial light modulator 5 operates at the instant a mixed effective light beam L2 strikes it, an optical image L3 having two mixed colors is projected on the screen 7.

To prevent this, it is necessary to turn off the spatial light modulator 5 at the times the spot of light SL passes the dividing points RGP, GBP, and BRP of the red filter RF, green filter GF, and blue filter BF to prevent projection of an optical image L3 of two mixed colors on the screen 7.

FIG. 24 shows the state in which the spatial light modulator 5 is supplied with R, G, and B image signals SR, SG, and SB in synchronization with the striking of the three R, G, and B effective light beams L2. The mixture of two colors of light in an optical image L3 is prevented by setting times T for turning off the spatial light modulator 5 between times of application of the R, G, and B image signal SR, SG, SB.

The off time T of the spatial light modulator 5, however, lowers the luminance of the optical image projected on the screen 7 and causes a lowering of the image quality of the projected full color image.

Accordingly, it is desirable that the spot SL of the emitted light L1 striking the transmission type color wheel 4 be as small as possible. The white light emitted from the discharge lamp 2a or other white light source is originally emitted from a light source with great limitations, however. Even if condensing this white light L1, the white light L1 cannot be focused completely to a single point. Consequently, the spot of light SL has a certain size.

For the reasons described above, as shown in FIG. 25, the diameter of the transmission type color wheel 4 must be made relatively large (normally the diameter-D is not less than approximately 10 cm). In a conventional image projector 1 of the system where in the transmission type color wheel 4 is arranged perpendicular to the optical axis P of the white light L1 emitted from the white source 1, the overall height H of the image projector 1 increases in proportion to the diameter D of the transmission type color wheel 4. Further, If the overall height of H of the image projector 1 increases, the overall volume of the image projector 1 increases, consequently the image projector 1 becomes large in size and heavy in weight. Further, costs are increased due to the increase of the casing material of the image projector 1 etc.

Accordingly, as shown in FIG. 26, it has been considered to make the transmission type color wheel 4 tilt slightly with respect to the optical axis P in order to make the overall height H of the image projector 1 shown in FIG. 25 as small as possible.

When tilting the transmission type color wheel 4 with respect to the optical axis P, however, as shown in FIG. 27A, the spot SL of the white light becomes an ellipse and increases in cross-sectional area. As described above, the time during which the spot of light SL passes the dividing points RGP, GBP, and BRP of the red filter RF, green filter GF, and blue filter BF of the transmission type color wheel 4 becomes longer, the time T for turning off the spatial light modulator 5 shown in FIG. 24 becomes longer, and consequently the luminance of the optical images L3 projected on the screen 7 ends up being lowered.

Note that in order to prevent this, as shown in FIG. 27B, by arranging the position at which the spot of light SL strikes the color wheel 4 directly below or directly above a center of rotation of the transmission type color wheel 4 and adjusting a direction of a short axis of the spot of light SL having an ellipse shape to a rotational direction of the transmission type color wheel 4, the time during which the spot of light SL passes the dividing points RGP, GBP, and BRP will not become that long.

In order to arrange the position where the spot of light SL strikes the color wheel 4 to be directly below or directly above the center of rotation of the transmission type color wheel 4, however, the transmission type color wheel 4 has to be offset above or below to the optical axis P of the white light L1 emitted from the white light source 1. If offsetting the transmission type color wheel 4 above or below the optical axis, however, the overall height H of the image projector 1 ends up increasing.

On the other hand, the three or four color filters 4b constituting the red filter RF, green filter GF, and blue filter BF (or white filter WF) are each designed to transmit a designated color and absorb or reflect light of other colors, that is, unwanted light. That is, the red filter RF transmits only R and absorbs or reflects the unwanted G and B(W) light. The green filter GF transmits only G and absorbs or reflects the unwanted R and B(W) light. The blue filter BF transmits only B and absorbs or reflects the unwanted R and G(W) light.

Accordingly, in a high luminance image projector 1 raising the optical energy of the white light L1 emitted from the white light source 2 so as to project optical images L3 of high luminance, the amount of absorption of the unwanted light at the color filters 4b of the transmission type color wheel 4 increases and the color filter 4b is easily damaged by the heat. Accordingly, it is desirable that the color filters 4b reflect the unwanted light as much as possible.

There is a method of using dichroic mirrors comprising a plurality of layers of coated thin films as the three or four color filters 4b constituting the red filter RF, green filter GF, and blue filter BF (white filter WF) of the transmission type color wheel 4. By using dichroic mirrors, it is possible to make the red filter RF, green filter GF, and blue filter BF (white filter WF) transmit respectively only specific R, G, and B(W) effective light beams L2 and reflect other unwanted light, consequently the amount of absorption of the unwanted light at the color filters 4b decreases and the color filters 4b become resistant to heating and damage.

If using dichroic mirrors as the color filters 4b of the transmission type color wheel 4 shown in FIG. 21, however, when the three or four color filters 4b of the transmission type color wheel 4 are struck by the white light L1 emitted from the white light source 2 and pass the R, G, and B (W) effective light beams L2, as shown by the dotted lines in FIG. 21, the unwanted light L4 reflected by the color filters 4b ends up directly returned to the white light source 1 side.

That unwanted light L4 conversely passes through the condenser lens 3 toward the white light source 2 side and is condensed by the reflection mirror 2b to strike and heat the discharge lamp 2a.

In general, high pressure gas is sealed in the discharge lamp 2a. If the discharge lamp 2a is heated by the unwanted light 14, the high pressure expands and therefore the discharge lamp 2a is easily destroyed. Furthermore, the ventilation around the discharge lamp 2a is very poor since the discharge lamp 2a is surrounded by the reflection mirror 2b. The discharge lamp 2a is therefore located in an environment where the temperature easily rises. Consequently, the discharge lamp 2a easily rises in temperature and is destroyed due to the unwanted light L4.

In order to prevent the heating and destruction of the discharge lamp 2a by the unwanted light L3, the discharge lamp 2a has to be cooled. However, it is extremely difficult to cool the discharge lamp 2a surrounded by the reflection mirror 2b effectively. If using an air cooling fan etc. for forced cooling, a large cooling fan becomes needed. This not only causes the image projector 1 to become larger and heavier, but also increases the power consumption due to the need to drive the large air cooling fan and creates the new problem of the noise caused by the operation of the large air cooling fan.

SUMMARY OF THE INVENTION

An object of the present invention is to provide an image projector capable of enlarging the diameter of the color wheel without increasing the overall height of the apparatus.

Another object of the present invention is to provide an image projector capable of preventing heating and damage of the color wheel caused by the absorption of light by the color filters, achieving superior heat dissipation, and saving power.

An image projector of the present invention uses a reflection type color wheel designed to receive white light emitted from a light source into light beams (effective light beams) of different wavelength bands at different times and guiding the light beams to the spatial light modulator without returning them to the light source.

Since an image projector of the present invention comprised as described above uses a reflection type color wheel to receive white light emitted from a light source to light beams of different wavelength bands at different times and directs the light beams to the spatial light modulator without returning them to the light source, it becomes possible to freely set the reflection type color wheel to any desired angle other than a right angle with respect to an optical axis of the white light emitted from the light source and to make the diameter of the reflection type color wheel larger without increasing the overall height of the apparatus.

Alternatively, the image projector of the present invention comprises a reflection type color wheel designed to receive white light emitted from a light source into light beams of different wavelength bands at different times and directs the light beams to the spatial light modulator without returning them to a light source and a means for processing and/or using unwanted light transmitted through the reflection type color wheel.

Since the image projector of the present invention comprised as described above uses a reflection type color wheel to direct the light beams to the spatial light modulator without returning them to the light source and pass the unwanted light, it becomes possible to prevent the color filters from being heated and destroyed by absorption of light like a transmission type color wheel. Further the means for processing and/or using the unwanted light transmitted through the transmission type color wheel enables improvement of the heat dissipation and a reduction in the power consumption.

BRIEF DESCRIPTION OF THE DRAWINGS

These and other objects and features of the present invention will become clearer from the following description of the preferred embodiments given with reference to the accompanying drawings, in which:

FIG. 21 is a schematic side view for explaining an example of using a transmission type color wheel in a conventional image projector;

FIGS. 22A and 22B are front views for explaining color filters of general transmission type color wheels;

FIGS. 27(a) and 27(b) for explaining a spot of light passing through a tilted transmission type color wheel shown in FIG. 26.

DESCRIPTION OF THE PREFERRED EMBODIMENTS

Figure 1:
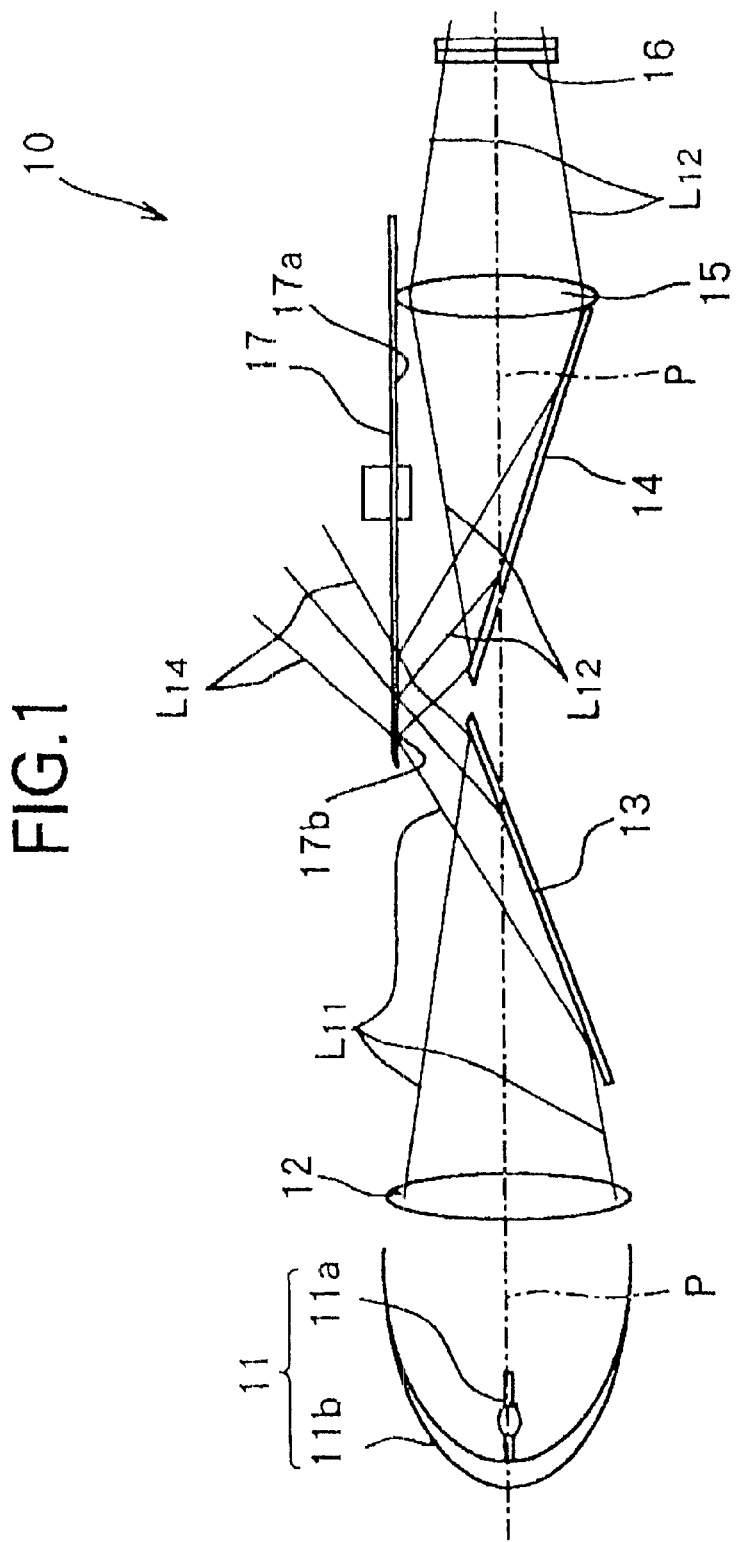
FIG. 1 is a schematic side view for explaining a configuration from a white light source to a spatial light modulator, including a reflection type color wheel, in an image projector of a first embodiment according to the present invention.

Below, a description will be given of image projectors according to preferred embodiments of the present invention.

First Embodiment

First, a first embodiment of an image projector 10 will be explained by using FIG. 1 to FIG. 4. In this case, an optical axis P of white light L11 emitted from a white light source 11 comprised by a discharge lamp 11a, reflection mirror 11b, etc. is set to be horizontal. A first condenser lens 12, a first and second mirror 13 and 14, a second condenser lens 15, and a spatial light modulator 16 are arranged approximately in series along the optical axis P. Further, a reflection type color wheel 17 is arranged horizontally approximately parallel with the optical axis P so that the reflection type color wheel 17 straddles upper parts or lower parts of the first and second mirrors 13 and 14 (arranging a wheel surface 17a of the reflection type color wheel 17 horizontally approximately parallel with the optical axis P). Further, the first and second mirrors 13 and 14 are arranged tilted in opposite directions symmetrically with respect to the optical axis P. These first and second mirrors 13 and 14 make the white light L11 strike the reflection type color wheel 17 at an angle, while the reflection type color wheel 17 makes the effective light beams L12 reflected at an angle toward an opposite direction from the white light L11 strike the spatial light modulator 16 along the optical path P. These thereby constitute an optical path changing means for changing an optical path.

The red filter RF, green filter GF, and blue filter BF (white filter WF arranged in case of need) comprised by three or four color filters 4b arranged at the periphery of the reflection type color wheel 17 and dividing the peripheral direction into three or four are comprised by so-called dichroic mirrors, that is, color filters constituted by a plurality of coated thin films. The three or four color filters 17b of the reflection type color wheel 17 are constituted so as to have reflection rates of the effective light beams which are higher than the transmission rates of the unwanted light 14. The white filter WF however should be finished to a mirror surface so as to be able to reflect all of the white effective light beam, that is, should be constituted to be a normal reflection mirror. Further, the white filter WF should be constituted to be a mirror reflecting only visible light for preventing infrared rays and ultraviolet rays from striking the spatial light modulator 16.

The image projector 10 using the reflection type color wheel 17 drives the reflection type color wheel 17 to rotate at a high speed (10 s to 100 s of revolutions per second) in a state approximately parallel with the optical axis P by a driving means (not shown). The white light L11 emitted from the white source 11 passes through the first condenser lens 12 to strike the first mirror 13, is reflected upward or downward at an angle by the first mirror 13 (changed in optical path for first time), and strikes the red filter RF, green filter GF, and blue filter BF (white filter WF) of the three or four color filters 17b of the reflection type color wheel 17 from above or below at an angle. Consequently, the white light L11 is split into the three or four R, G, B(W) effective light beams L12 of wavelength bands shifted by time. The split effective light beams L12 are reflected toward the side opposite to the first mirror 13, that is, toward the second mirror 14, upward or downward at an angle.

That is, the red filter RF reflects only the red effective light beam L12 and transmits the G, B (W) unwanted light beams L14. The green filter GF reflects only the green effective light beam L12 and transmits the R, B (W) unwanted light beams L14. The blue filter BF reflects only the blue effective light beam L12 and transmits the R, G (W) unwanted light beams L14.

The three or four R, G, B (W) effective light beams L12 having wavelength bands shifted by time are reflected toward the second mirror 14 by the reflection type color wheel 17 in this way. The reflected effective light beams L12 are further reflected to a direction parallel with the optical axis P by the second mirror 14 (changed in optical path for second time) and strike the second condenser lens 15. Then, the spatial light modulator 16 supplies R, G, B (W) image signals in synchronization with the time the three or four R, G, B (W) effective light beams L12 strike it so as to modulate the beams to optical images L13 of wavelength bands shifted by time. The optical images L13 are projected on a screen 19 etc. by a projection lens 18 to project a full color image on the screen 19 etc.

According to the image projector 10 of the first embodiment, the white light L11 emitted from the white source 11 is made to strike the reflection type color wheel 17 at an angle by the first mirror 13 constituting a first optical path changing means and is split and reflected into three or four R, G, B (W) effective beams L12 of wavelength bands shifted by time and the R, G, B (W) effective light beams L12 reflected by the color filters 17b are guided to the spatial light modulator 16 by the second mirror 14 constituting the second optical path changing means without returning the unwanted light L14 to the white light source 11. Consequently, it is possible to set the reflection type color wheel 17 to any desired angle other than a right angle with respect to the optical axis P of the white light L11 emitted from the white light source 11 and therefore make the diameter of the reflection type color wheel 17 larger without increasing the overall height of the image projector 10.

Figure 2:
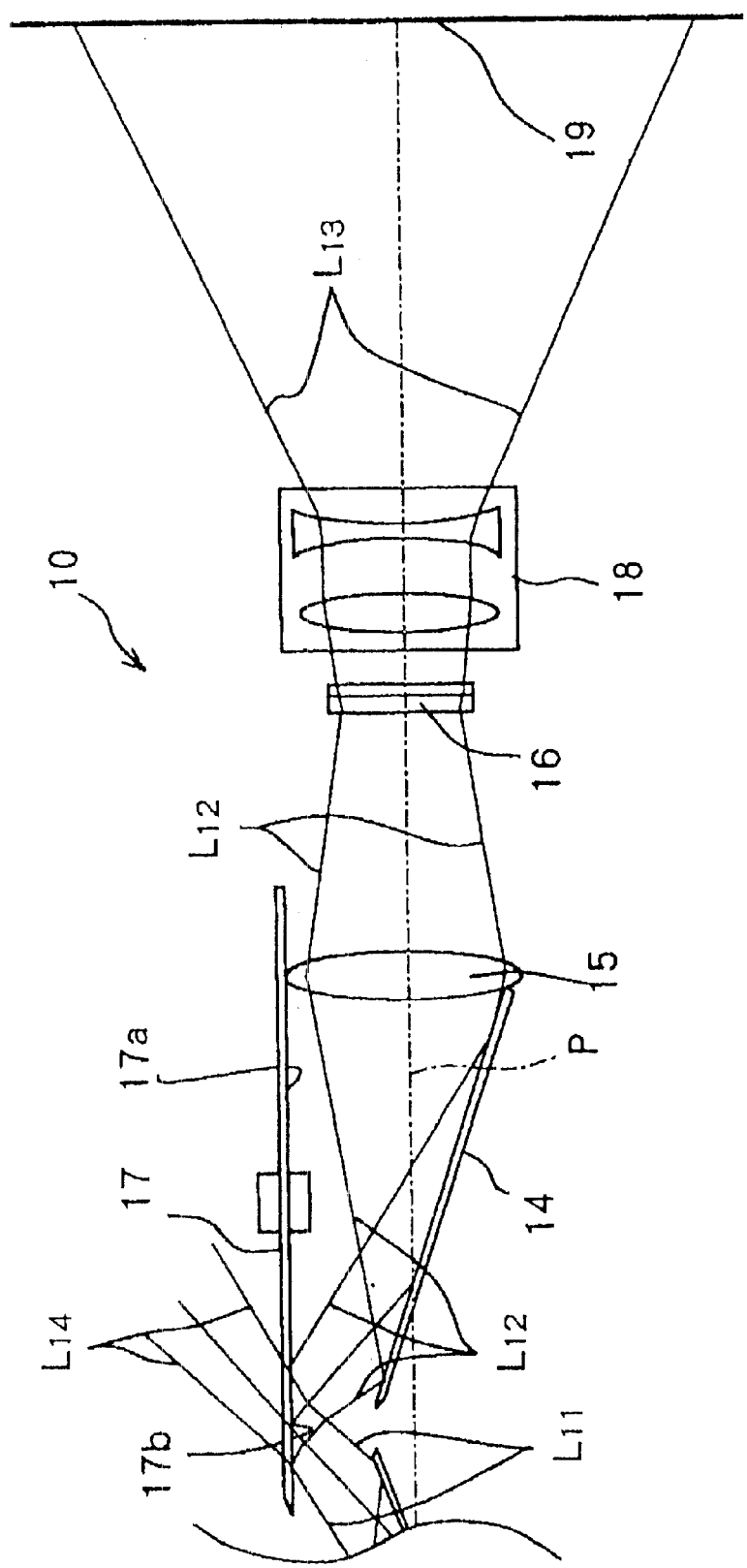
FIG. 2 is a schematic side view for explaining a configuration from a reflection type color wheel to a screen of the image projector.
Figure 3:
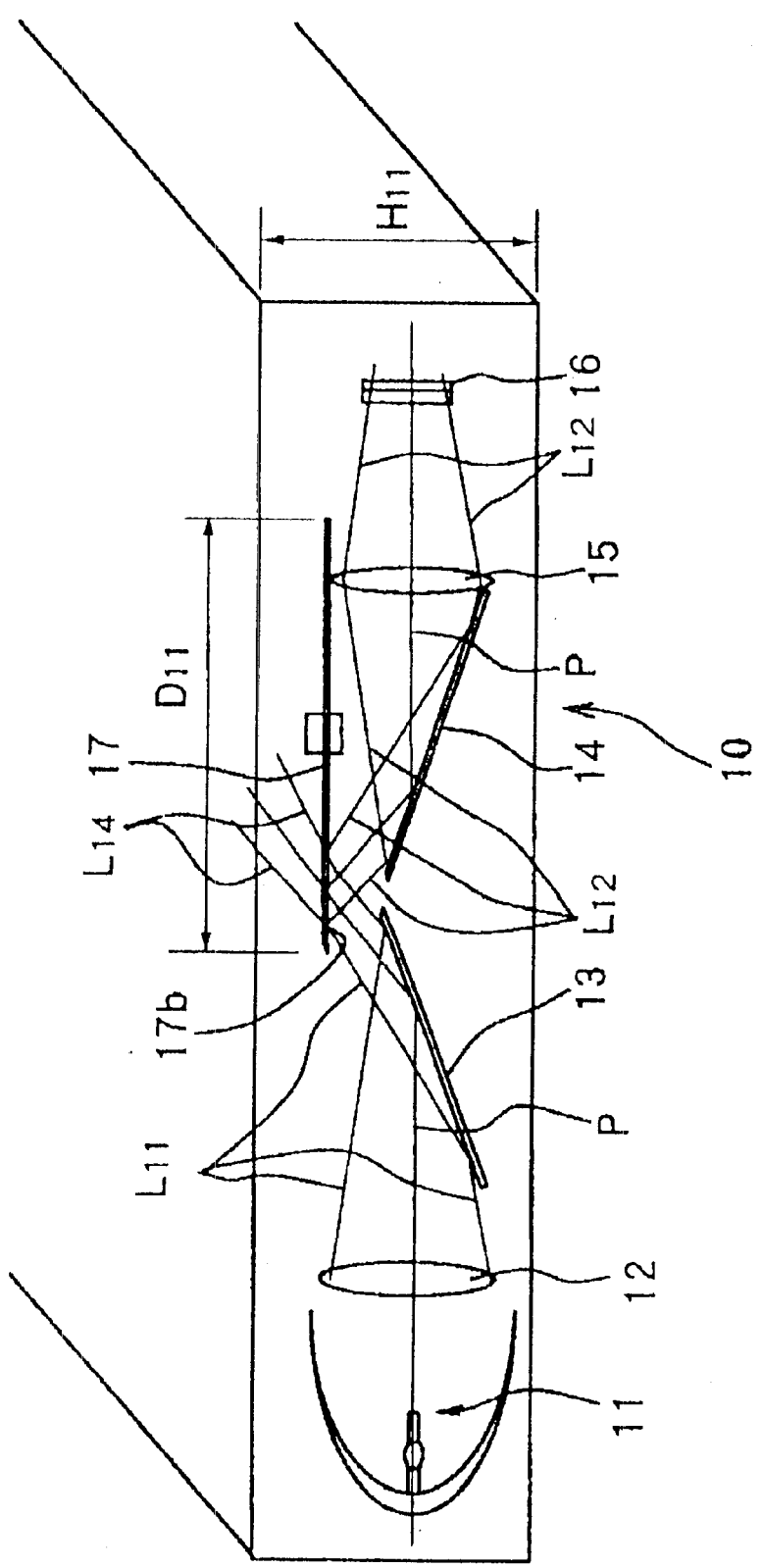
FIG. 3 is a schematic perspective view for explaining an overall height of the image projector and an enlarged state of the reflection type color wheel.

That is, according to the image projector 10 of the first embodiment, as shown in FIG. 1 and FIG. 2, the reflection type color wheel 17 is arranged substantially horizontal to the optical axis P, so, as shown in FIG. 3, so it is possible to arrange the reflection type color wheel 17 horizontal at the upper side or lower side in the image projector 10.

Consequently, according to this image projector 10, the disadvantage of the overall height H11 of the image projector 10 being determined by the size of the diameter D11 of the reflection type color wheel 17 does not occur and it is possible to remarkably reduce the overall height of the image projector 10 in comparison with the overall height of the image projector 7 of the prior art. That is, even when setting the diameter D11 of the reflection type color wheel 17 much larger than the diameter D of the transmission type color wheel 3 of the prior art, the overall height H11 of the image projector 10 can be made a minimum height much less than the overall height H of the image projector 7 of the prior art.

Figure 24:
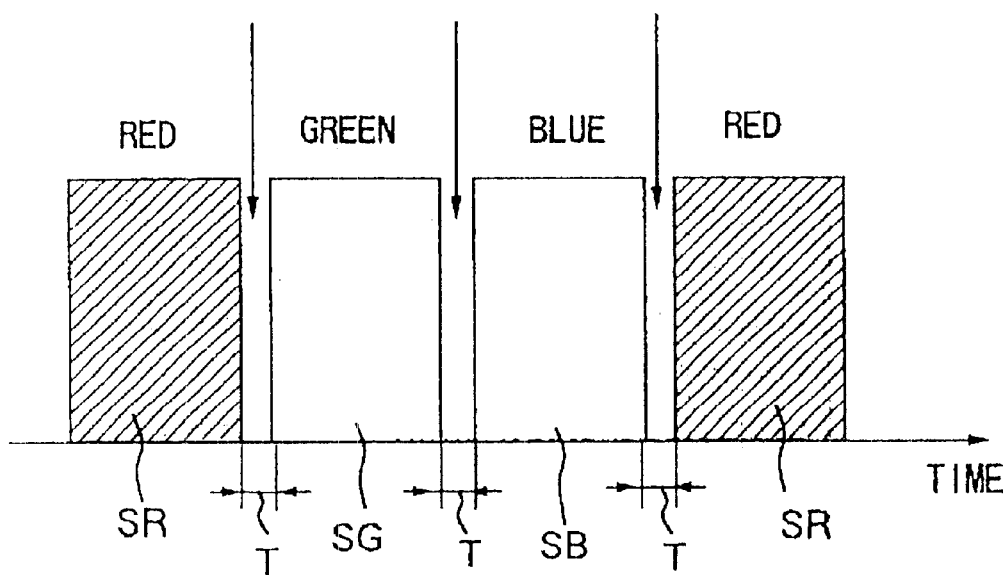
FIG. 24 is a view for explaining image signals to be supplied to a spatial light modulator and off times of the image signals.

Since it is possible to set the diameter D11 of the reflection type color wheel 17 much larger than the diameter D of the transmission type color wheel 4, even when setting the rotational speed of the reflection type color wheel 17 to the same speed as that of the transmission type color wheel 4 of the prior art (10 s to 100 s of revolutions per second), the peripheral speed of the three or four color filters 17b formed on the periphery of the reflection type color wheel 17 at the time of rotation can be made faster than the peripheral speed of the color filters 4b of the transmission type color wheel 4 of the prior art at the time of rotation. If the peripheral speed of the color filters 17b at the time of rotation becomes faster, the time T for turning the spatial light modulator 16a off while supplying the image signals SR, SG, SB to the spatial light modulator 16, explained in FIG. 24, can be shortened, so it becomes possible to improve the luminance of the optical images L13 projected on the screen 19 etc.

Figure 4:
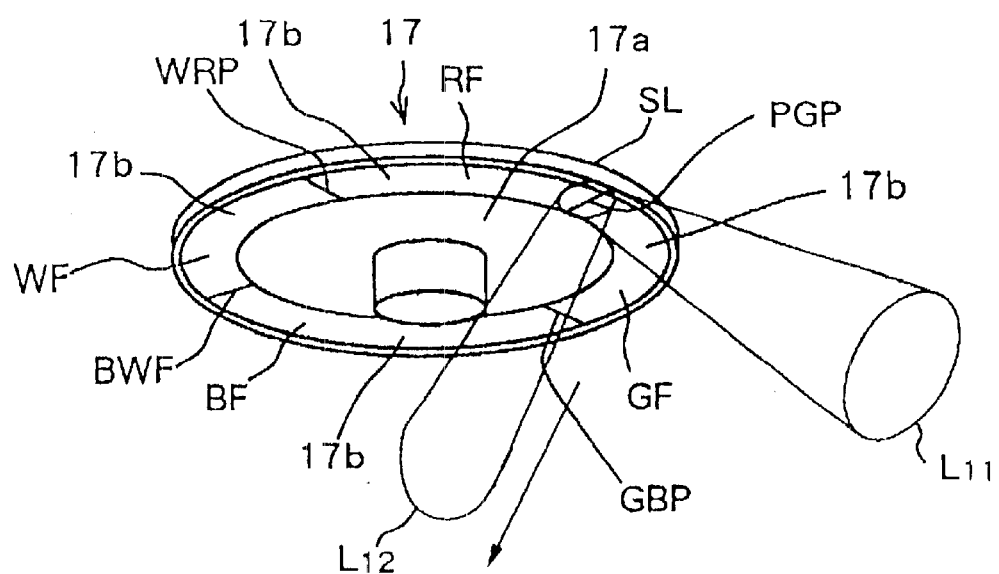
FIG. 4 is a perspective view seen from below for explaining a spot of white light striking the reflection type color wheel of the image projector.

Note that according to this image projector 10, as shown in FIG. 4, since the white light L11 emitted from the white source 11 strikes the three or four color filters 17b of the reflection type color wheel 17 at an angle, in the same way as explained in FIG. 27A, the spot SL of the emitted light L11 on the color filters 17b becomes an ellipse and becomes larger in cross-sectional area, the time during which the spot of light SL passes the dividing points of the red filter RF, green filter GF, and blue filter BF (white filter WF) of the three or four color filters 17b of the reflection type color wheel 17 becomes longer, and the disadvantage of the time T for turning off the spatial light modulator 16 becomes longer, but this problem can be solved by setting the diameter D of the reflection type color wheel 17 larger and making the peripheral speed of the color filters 17b at the time of rotation faster. Further, as explained in FIG. 28B, by selecting the position where the spot of light SL strikes the wheel so that the short axis direction of the spot of light SL having the elliptical shape in the rotational direction of the reflection type color wheel 17, it is possible to avoid the disadvantage of the time for turning the spatial light modulator 16 off being longer and to set a short off time T of the spatial light modulator 16 approximately the same as when that the white light L11 strikes the color filters 17b of the reflection type color wheel 17 in a perpendicular direction.

Further, as shown in FIG. 1 and FIG. 2, according to the system arranging the wheel surface 17a of the reflection type color wheel 17 to be parallel to the optical axis P of the white light L11 emitted from the white light source 11 and making the white light L11 strike the three or four color filters 17b of the reflection type color wheel 17 at an angle by the first mirror 13, the unwanted light L14 not selected by the reflection type color wheel 17 is transmitted to the rear of the reflection type color wheel 17. Consequently, the unwanted light L14 is completely prevented from reaching the discharge lamp 11a constituting the white light source 11. Accordingly, the discharge lamp 11a is not heated by the unwanted light L14, the heat load on the discharge lamp 11a can be reduced, and the discharge lamp 11a can be easily cooled.

Second Embodiment

Figure 5:
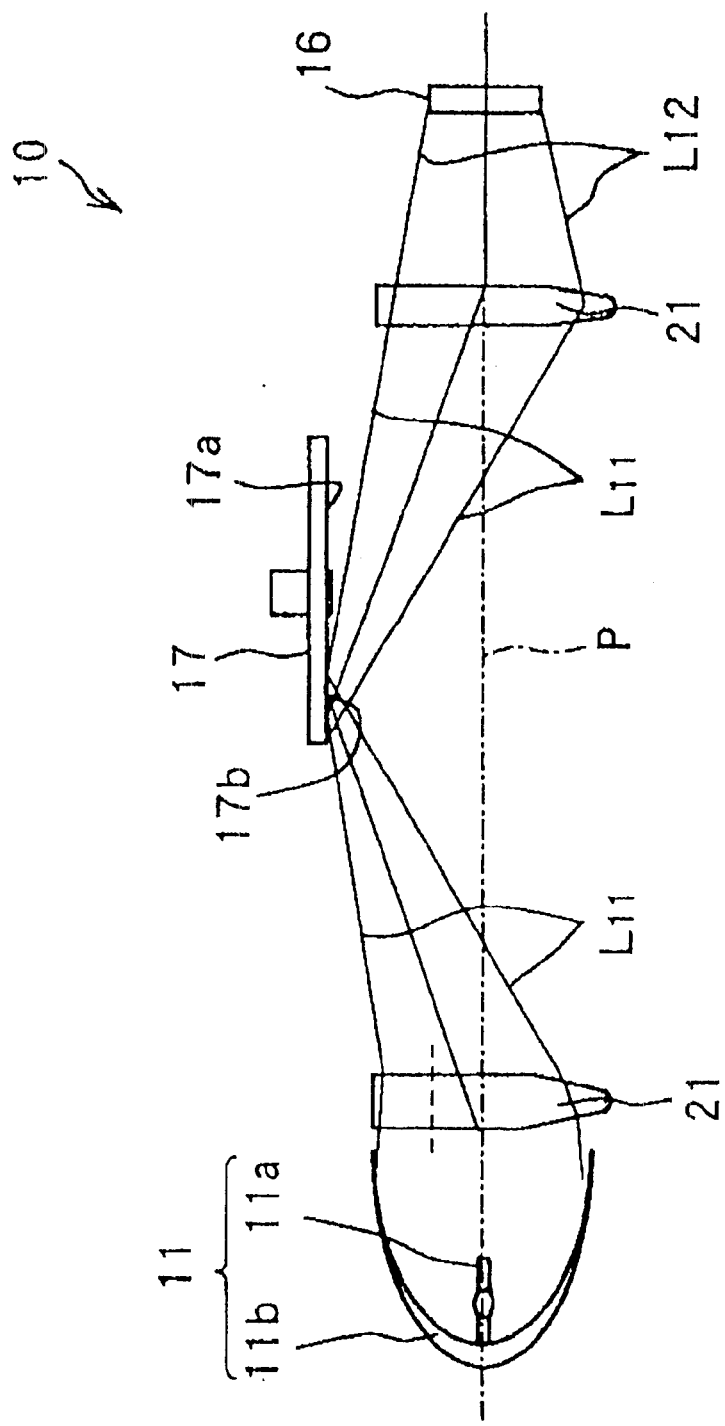
FIG. 5 is a schematic side view for explaining a second embodiment of an image projector of the present invention.

FIG. 5 shows a second embodiment of an image projector 10. In this case, the costs are reduced by replacing the first and second condenser lenses 12 and 15 shown in the first embodiment with first and second decentered lenses 21, 22 and using the lenses 21, 22 both as condenser lenses and optical path changing means and thereby eliminating the first and second mirrors 13, 14 constituting the optical path changing means shown in the first embodiment. That is, according to the second embodiment of the image projector 10, the white light L11 emitted from the white light source 11 is condensed and made to strike the reflection type color wheel 17 at an angle by the first decentered lens 21, while the three or four R, G, B (W) effective light beams L12 of wavelength bands shifted by time split and reflected by the reflection type color wheel 17 are condensed by the decentered lens 22 and made to strike the spatial light modulator 16 in parallel with the optical axis P. Note that, in this case, an optical device called a light integrator capable of lighting with a uniform luminance may be placed between the reflection type color wheel 17 and the spatial light modulator 16. The light integrator and a glass rod may also be combined or two multi-lens arrays may also be used.

Third Embodiment

Figure 6:
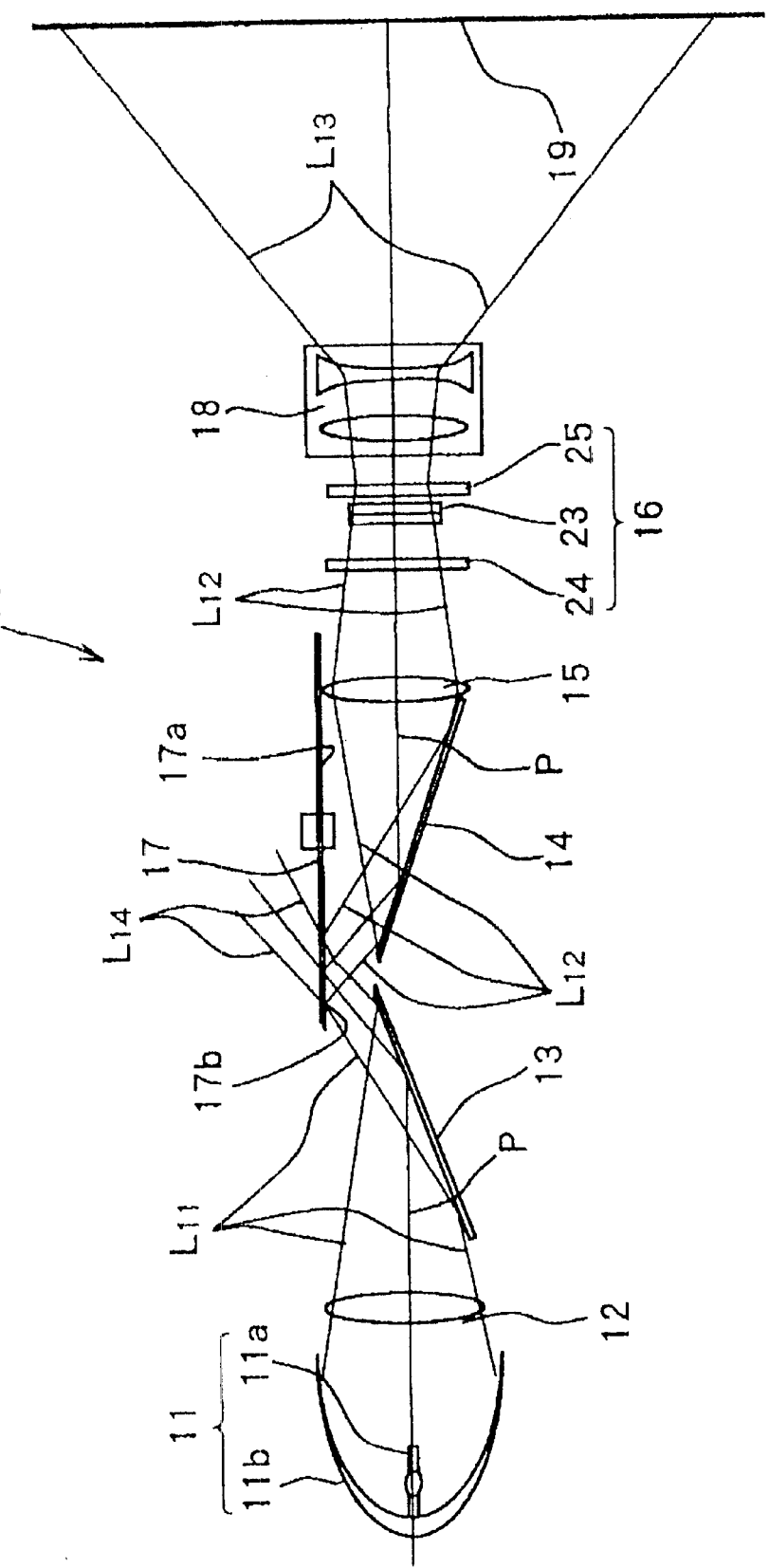
FIG. 6 is a schematic side view for explaining a third embodiment of an image projector of the present invention.

FIG. 6 shows a third embodiment of the image projector 10. In this case, a transmission type liquid crystal panel 23 comprised by a liquid crystal material is used as the spatial light modulator 16. An incident side polarization plate 24 and an emission side polarization plate 25 are arranged before and after the transmission type liquid crystal panel 23. The three or four R, G, B (W) effective light beams L12 of wavelength bands shifted by time obtained by the reflection type color wheel 17 splitting and reflecting the white light into three or four colors of R, G, B (W) are made to strike the transmission type liquid crystal panel 23 through the incident side polarization plate 24 by the second mirror 14 and the second condenser lens 15. The transmission type liquid crystal panel 23 supplies R, G, B (W) image signals in synchronization with the time the three or four R, G, B (W) effective light beams L12 strike it so as to pass and emit three or four R, G, B (W) optical images L13 (and white light for improving the luminance) of wavelength bands shifted by time. The optical images L13 are projected to the screen 19 etc. by the projection lens 18.

Fourth Embodiment

Figure 7:
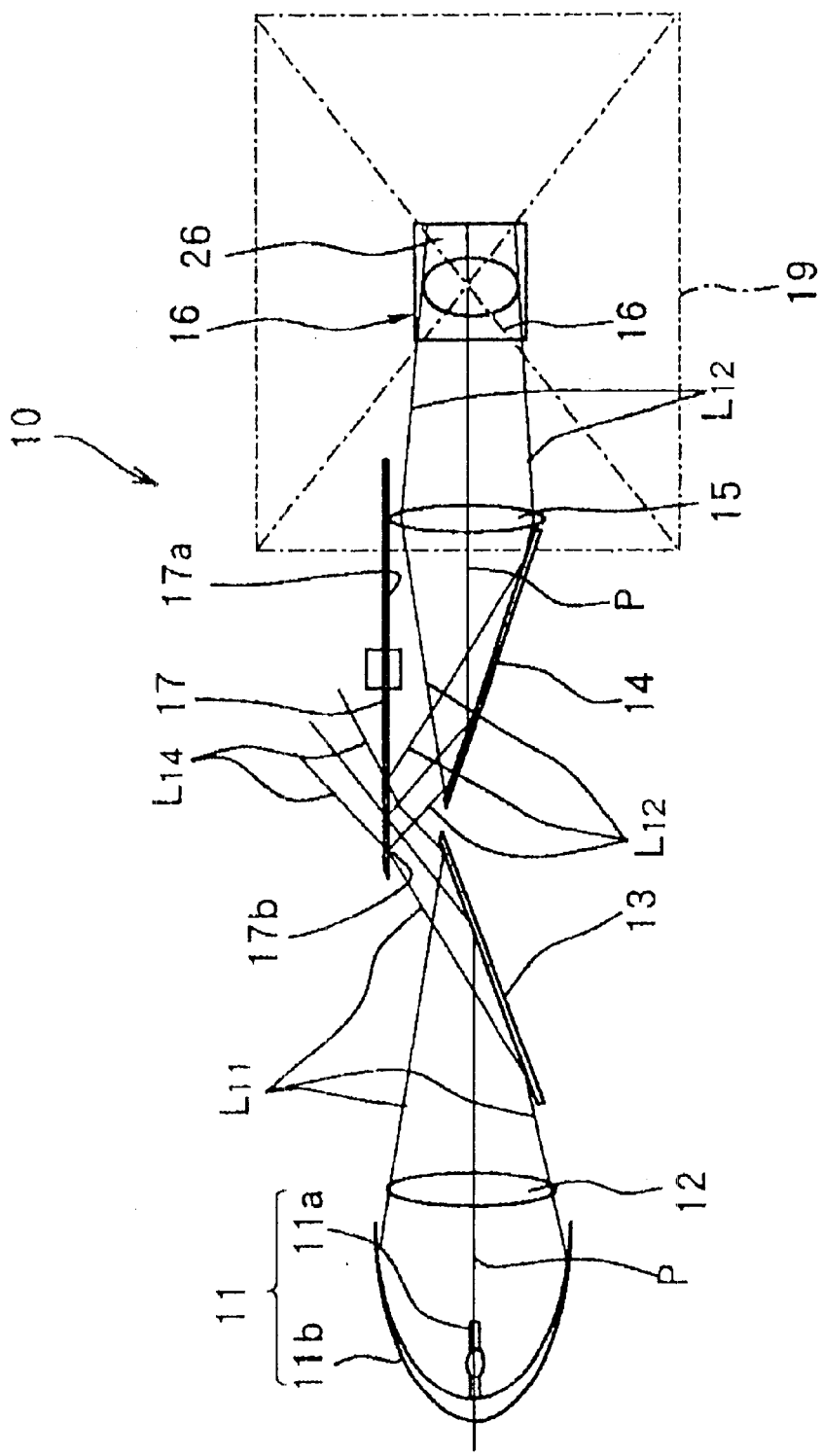
FIG. 7 is-a schematic side view for explaining a fourth embodiment of an image projector of the present invention.
Figure 8:
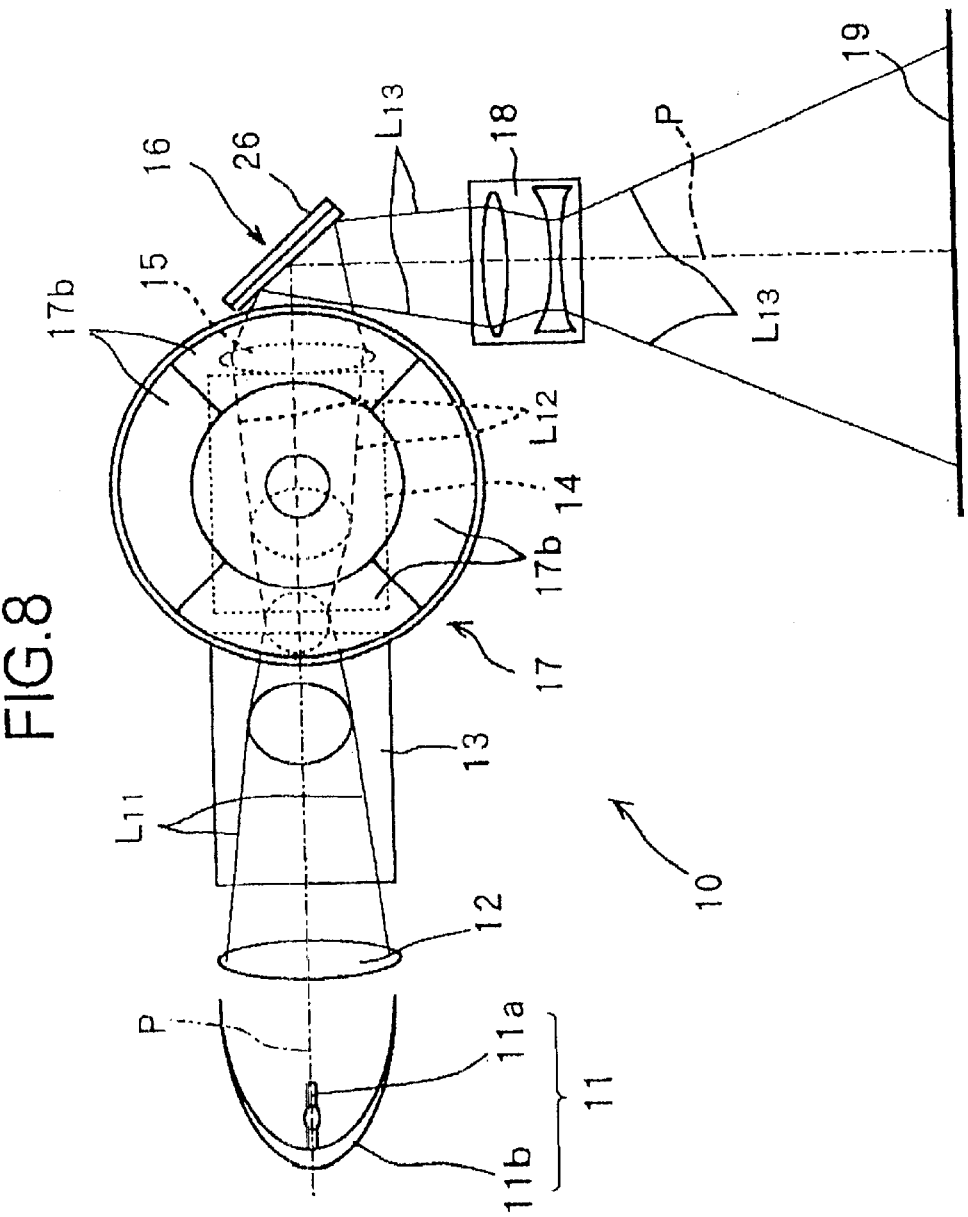
FIG. 8 is a plane-view of FIG. 7.

FIG. 7 and FIG. 8 show a fourth embodiment of the image projector 10. In this case, a digital micro-mirror device (DMD) 26 is used as the spatial light modulator 16. The DMD 26 uses a plurality of independently driven micro-mirrors having a two-dimensional array structure to reflect incident light and control an emission of optical images based on image signals. The three or four R, G, B (W) optical images L12 of wavelength bands shifted by time which are split and reflected by the reflection type color wheel 17 are condensed and made to strike the DMD 26 by the second mirror 14 and the second condenser lens 15. By supplying R, G, B (W) image signals to the DMD 26 in synchronization with the time the three or four R, G, B (W) effective light beams L12 strike the DMD 26, the micro-mirrors constituting the pixels of the DMD 26 are moved and three R, G, B (W) optical images (and white light for improvement of luminance) of wavelength bands shifted by time are reflected to one side in the horizontal plane including the optical axis P and projected to the screen 19 etc. by the projection lens 18.

Fifth Embodiment

Figure 9:
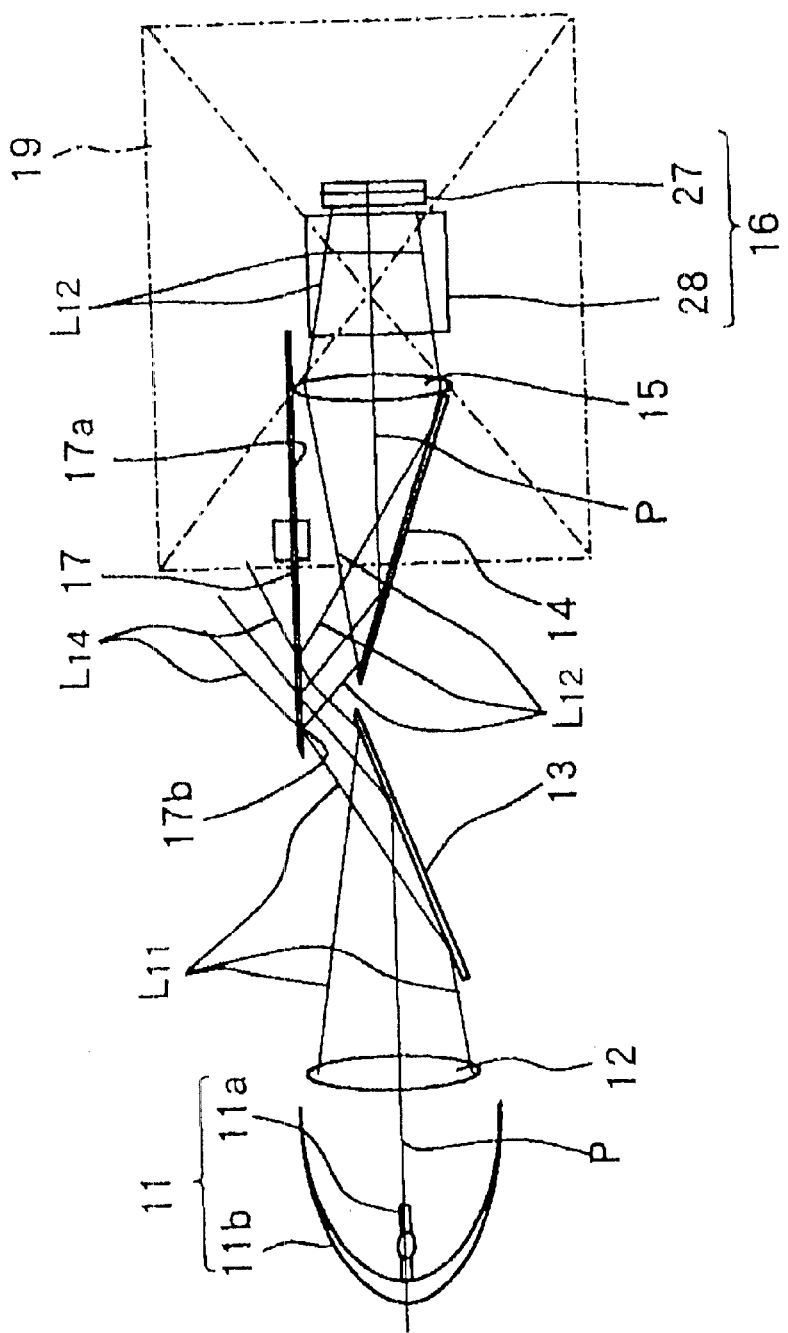
FIG. 9 is a schematic side view for explaining a fifth embodiment of an image projector of the present invention.
Figure 10:
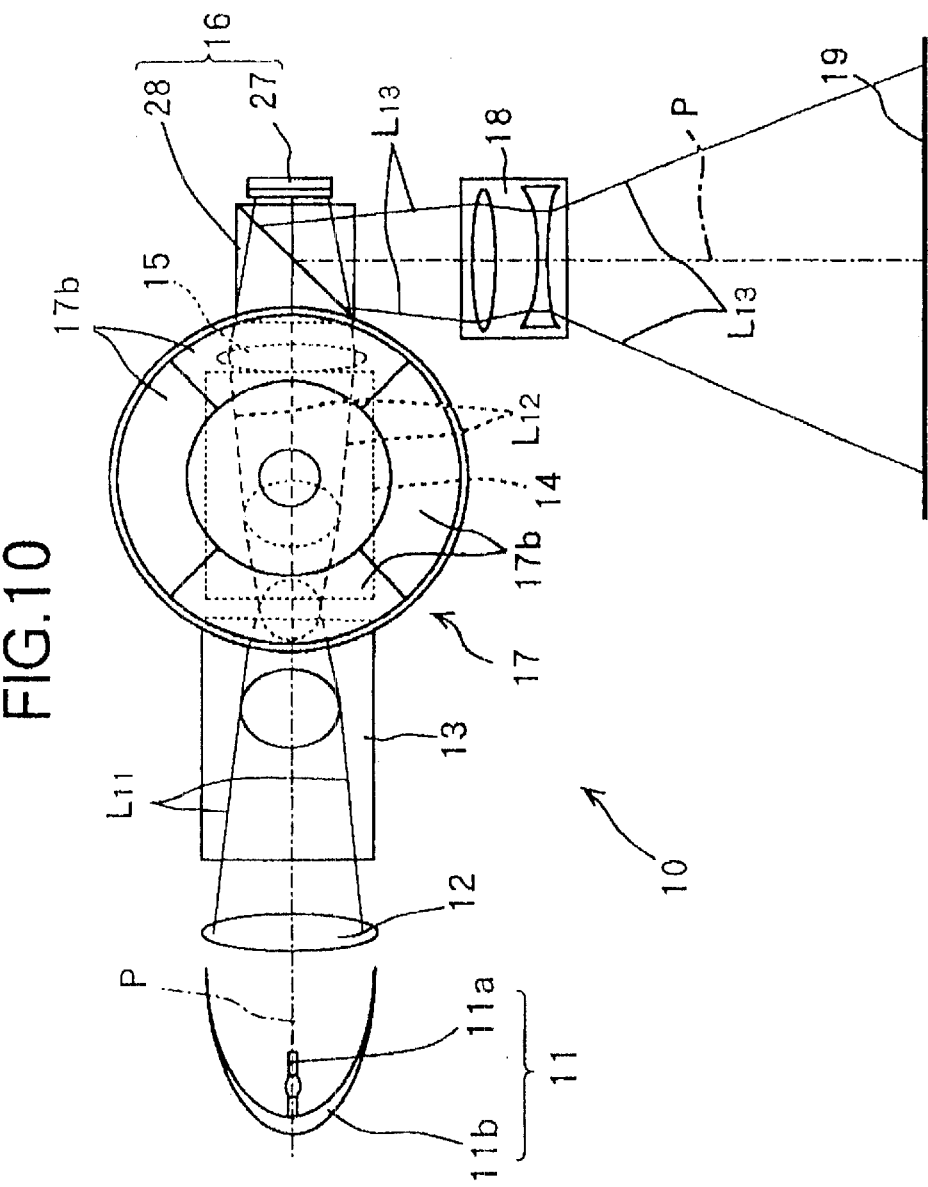
FIG. 10 is a plane view of FIG. 9.

FIG. 9 and FIG. 10 show a fifth embodiment of the image projector 10. In this case, a reflection type liquid crystal panel 27 comprised by a liquid crystal material is used as the spatial light modulator 16. A polarizing beam splitter 28 is arranged between the second condenser lens 15 and the reflection type crystal panel 27. The three or four R, G, B (W) effective light beams L12 of wavelength band shifted by time split and reflected by the reflection type color wheel 17 are guided by the second mirror 14 and the second condenser lens 15 to pass through the polarization beam splitter 28. Predetermined polarization waves (for example, S-waves) thereby strike the reflection type liquid crystal panel 27. By supplying R, G, B (W) image signals to the reflection type liquid crystal panel 27 in synchronization with the time of the three or four R, G, B (W) effective light beams L12 strike the panel, the polarization states of the light beams are controlled in correspondence with the signals. Optical images L13 are obtained by reflecting the predetermined polarization waves (for example, P-waves) by the polarization beam splitter 28. The optical images L13, bent 90 degrees in the horizontal plane including the optical axis P by the polarizing beam splitter 28, then strike the projection lens 18 and are projected to the screen 19 etc.

According to the image projectors of the above embodiments, since a reflection type color wheel is used to split and reflect the white light emitted from the light source to effective light beams of wavelength bands shifted by time and the effective light beams are guided to the spatial light modulator without returning to the light source, it is possible to prevent the light source from being heated and therefore improve the dependability. Further, since it is possible to set the reflection type color wheel to any desired angle other than a right angle with respect to the optical axis of the white light emitted from the light source, it becomes possible to make the diameter of the reflection type color wheel larger without increasing the overall height of the apparatus. Consequently, it is possible to shorten the time for turning off the spatial light modulators and to improve the luminance of the emitted optical images.

Further, according to the image projectors of the above embodiments, since the reflection type color wheel is used to split and reflect the white light emitted from the light source to effective light beams of wavelength bands shifted by time and the effective light beams are guided to the spatial light modulators without returning to the light source and since at that time the reflection type color wheel is arranged in parallel with the optical axis of the white light emitted from the light source and/or the effective light beams striking the spatial light modulator and an optical path changing means is provided for making the white light strike the reflection type color wheel at an angle and/or for making the effective light beams reflected from the reflection type color wheel strike the spatial light modulator at an angle, it is possible to arrange the reflection type color wheel within the image projector horizontally and increase the diameter of the reflection type color wheel to the maximum while maintaining the minimum overall height of the apparatus and thereby realize a high quality image projector remarkably improved in the luminance of the projected optical images.

Sixth Embodiment

Figure 11:
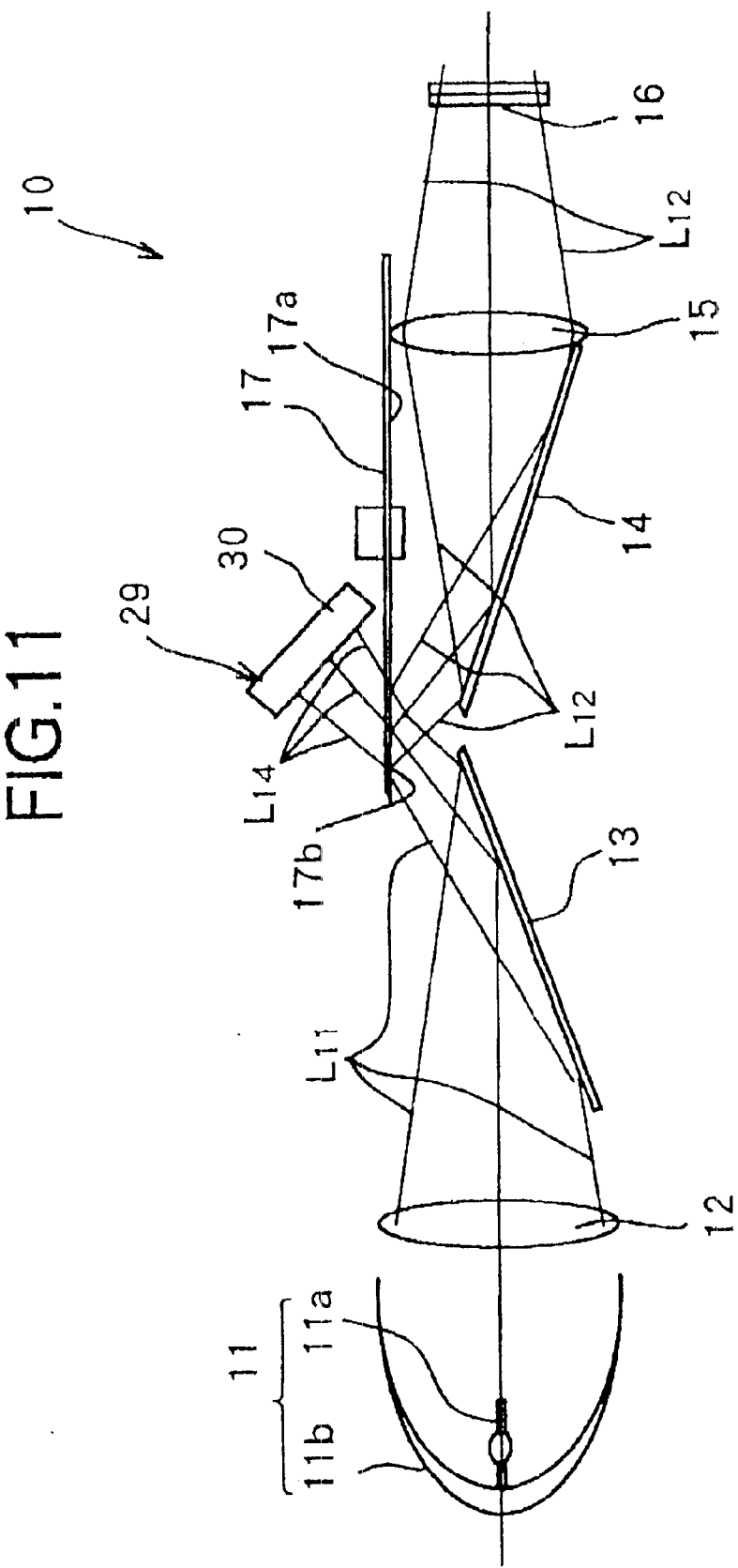
FIG. 11 is a schematic side view for explaining a sixth embodiment of an image projector of the present invention.

FIG. 11 shows a sixth embodiment of the image projector 10. In this case, by arranging a solar battery 30, an example of a means 29 for processing and/or using the unwanted light L14, at the rear of the reflection type color wheel 17 and using the unwanted light L14 transmitted to the rear of the reflection type color wheel 17 to strike the solar battery 30, the solar battery 30 uses the unwanted light L14 to generate power to cover part of the power requirements of the image projector 10 and thereby reduce the overall power consumption of the image projector 10. Further, the. conversion of light to power in the solar battery 30 reduces the generation of heat energy by the amount of conversion to power and therefore facilitates cooling of the inside of the image projector 10.

Seventh Embodiment

Figure 12:
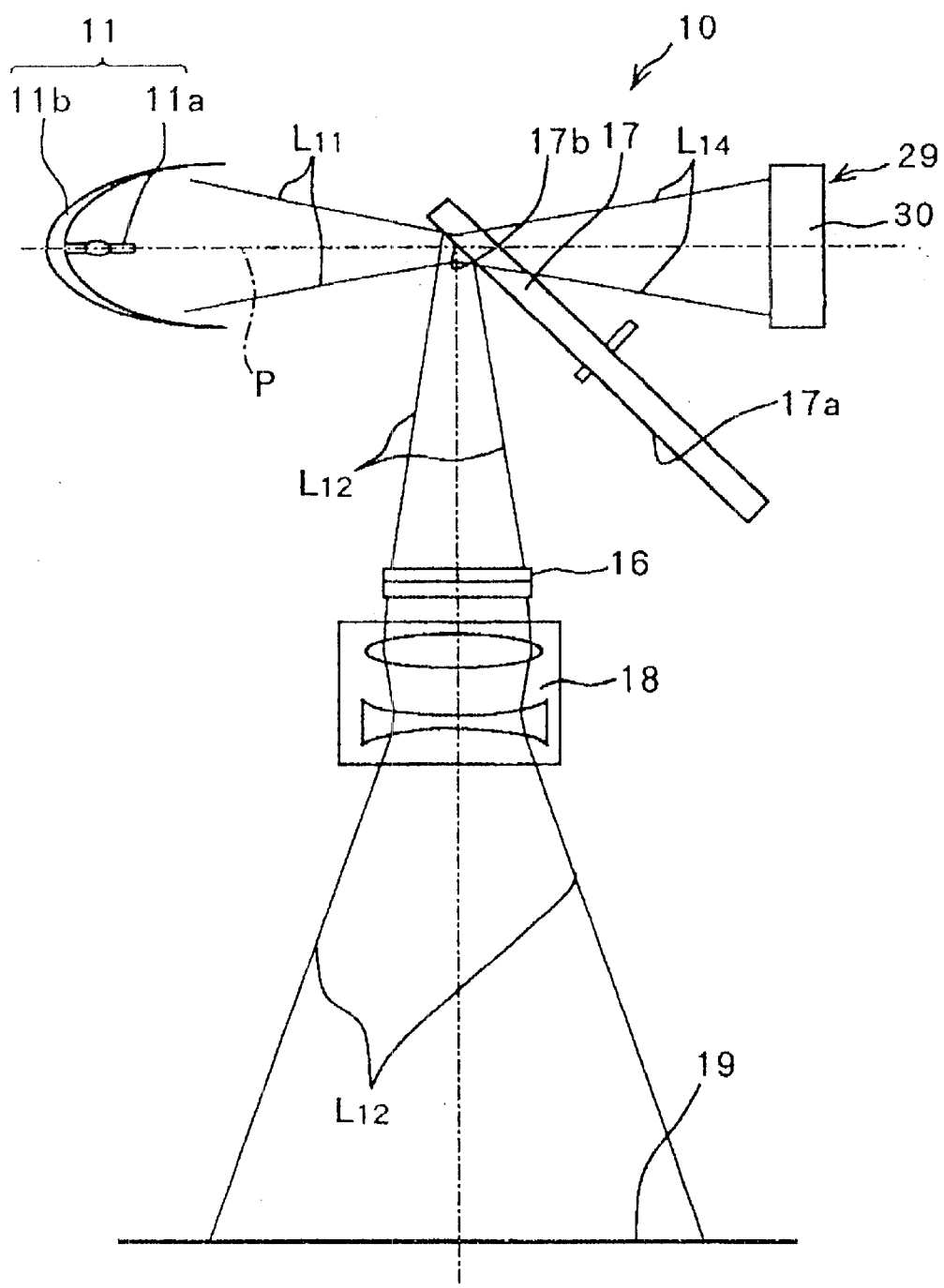
FIG. 12 is a schematic side view for explaining a seventh embodiment of an image projector of the present invention.

FIG. 12 shows a seventh embodiment of the image projector 10. In this case, the reflection type color wheel 17 is arranged at an angle of approximately 45 degree from the optical axis P of the white light L11 emitted from the white light source 11 so as to make the reflection efficiency of the effective light beams L12 and the transmission efficiency of the unwanted light L14 approximately uniform. The condenser lens 12 at the white light source 11 side shown in the sixth embodiment is eliminated. The white light L11 emitted from the discharge lamp 11a constituting the white light source 11 is made to strike the three or four color filters 17b of the reflection type color wheel 17 at an angle of about 45 degrees by the reflection mirror 11. The split R, G, B (W) effective light beams L12 of wavelength bands shifted by time as described before are reflected with a high efficiency at angles of approximately 45 degree and strike the spatial light modulator 16. The R, G, B (W) optical images L13 modulated to wavelength bands shifted by time by the spatial light modulator 16 as described before are projected to the screen 19 etc. by the projection lens 18. A solar battery 30, an example of a means 29 for processing and/or using the unwanted light L14, is arranged at a right angle with respect to the unwanted light L14 at the rear of the reflection type color wheel 17 (opposite side of the white light source 11). The unwanted light L14 of the white light L11 transmitted with a high efficiency to the rear of the reflection type color wheel 17 strikes the solar battery 30 whereupon the solar battery 30 generates power. In the same way as in the sixth embodiment, it is therefore impossible to reduce the power consumption of the image projector 10. Further, the costs are reduced by eliminating the condenser lens 12 at the white light source 11 side and therefore reducing the number of parts and assembly work. Note that the angle of the reflection type color wheel 17 with respect to the optical axis P does not necessarily have to be 45 degree. It is possible to change the angle in accordance with the arrangement of the optical system of the image projector 10 etc.

Eighth Embodiment

Figure 13:
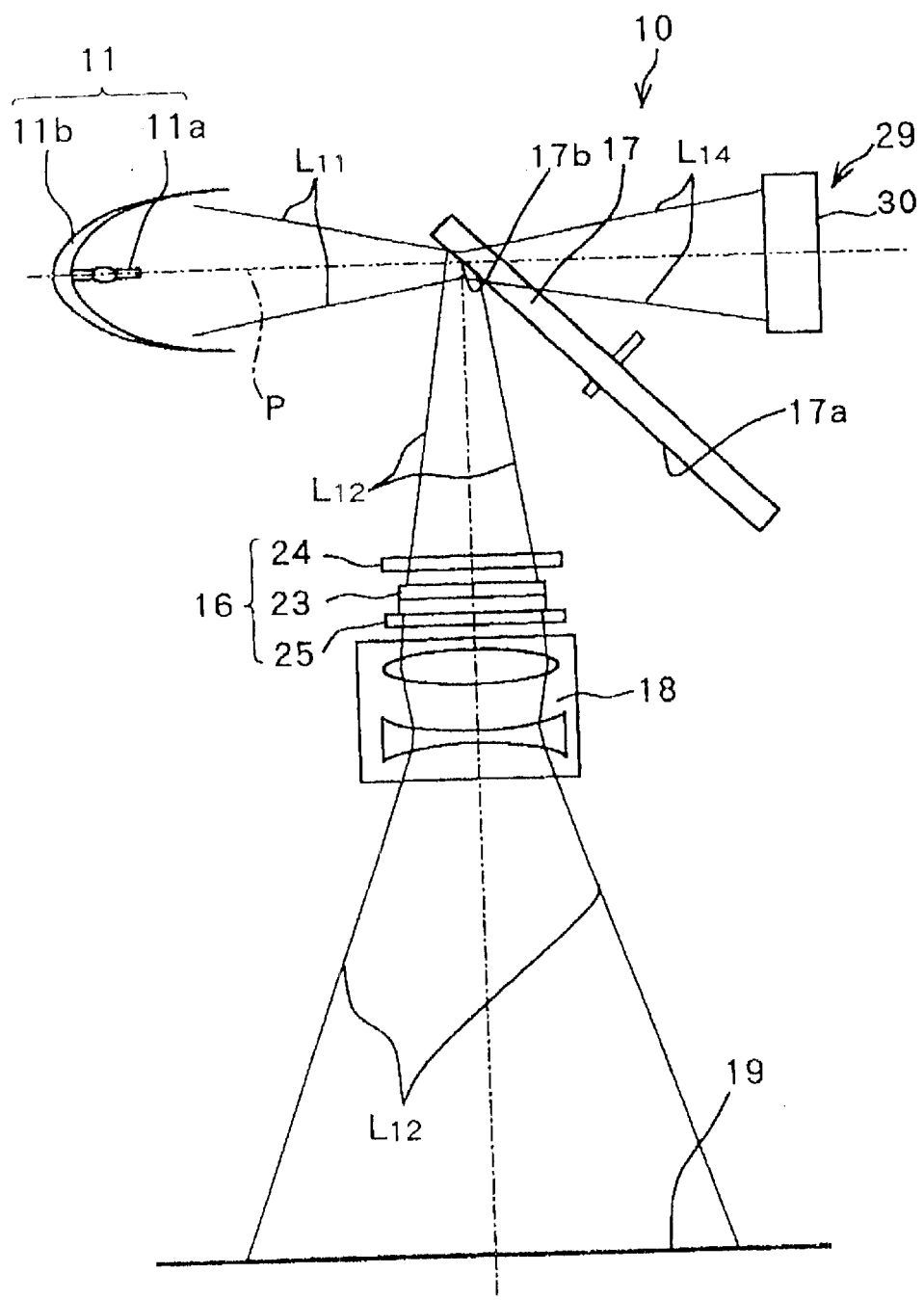
FIG. 13 is a schematic side view for explaining an eighth embodiment of an image projector of the present invention.

FIG. 13 shows an eighth embodiment of the image projector 10. In this case, a transmission type liquid crystal panel 23 is used as the spatial light modulator 16 of the seventh embodiment. An incident side polarization plate 24 and an emission side polarization plate 25 are disposed at the incident side and the emission side.

Ninth Embodiment

Figure 14:
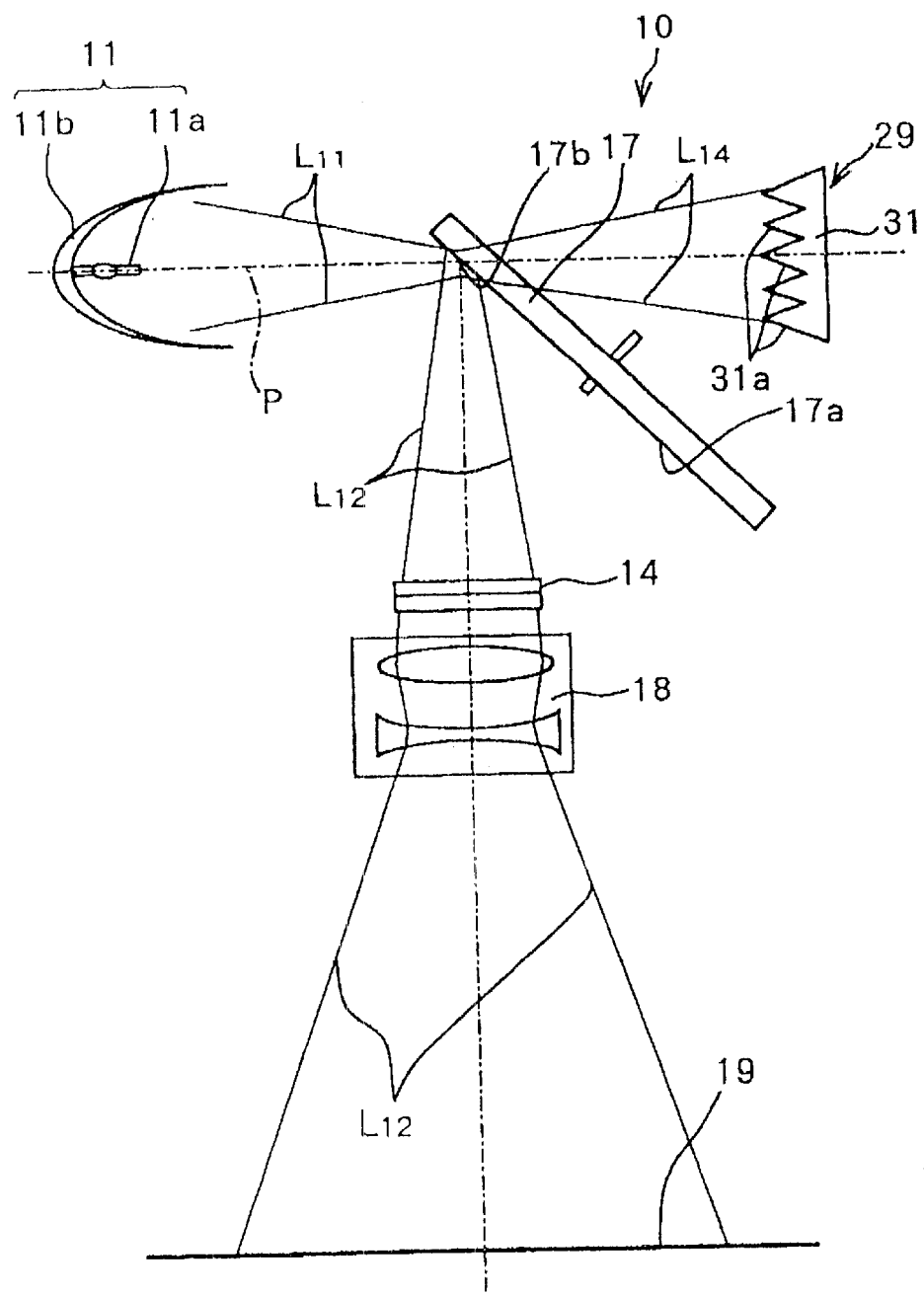
FIG. 14 is a schematic side view for explaining a ninth embodiment of an image projector of the present invention.

FIG. 14 shows a ninth embodiment of the image projector 10. In this case, a heat sink 31 is arranged as a means 29 for processing and/or using the unwanted light L14 of the seventh embodiment. The heat sink 31 blocks the unwanted light L14 and dissipates the heat of the unwanted light L14 with a high efficiency by a plurality of radiating fins 31a. It is also possible to simultaneously use an air cooling fan (not shown) to raise the heat dissipation efficiency of the unwanted light L14 at the heat sink 31. Consequently, according to the ninth embodiment, it is possible to prevent the unwanted light L14 from returning to the white light source 11 and dissipate heat with a high efficiency at the heat sink 31. Further, it is possible to disperse the heat sources in the image projector 10 into the white light source 11 portion and the heat sink portion 31 and effectively cool both. Consequently, cooling of the inside of overall image projector 10 is facilitated and a large air cooling fan used conventionally becomes unnecessary.

10th Embodiment

Figure 15:
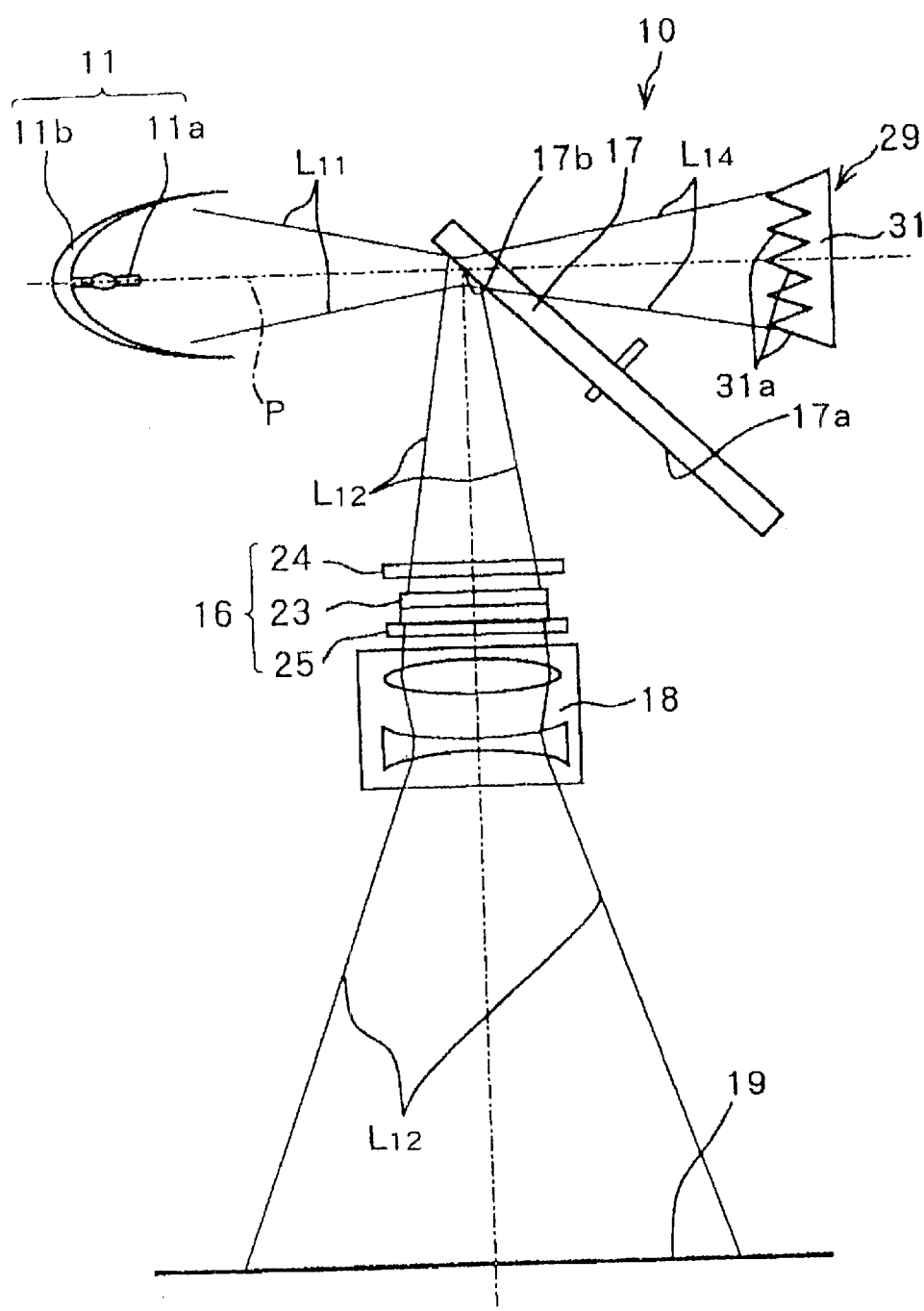
FIG. 15 is a schematic side view for explaining a 10th embodiment of an image projector of the present invention.

FIG. 15 shows a 10th embodiment of the image projector 10. In this case, a transmission type liquid crystal panel 23 is used as the spatial light modulator 16 in the ninth embodiment. An incident side polarization plate 24 and an emission side polarization plate 25 are arranged at the incident side and the emission side.

11th Embodiment

Figure 16:
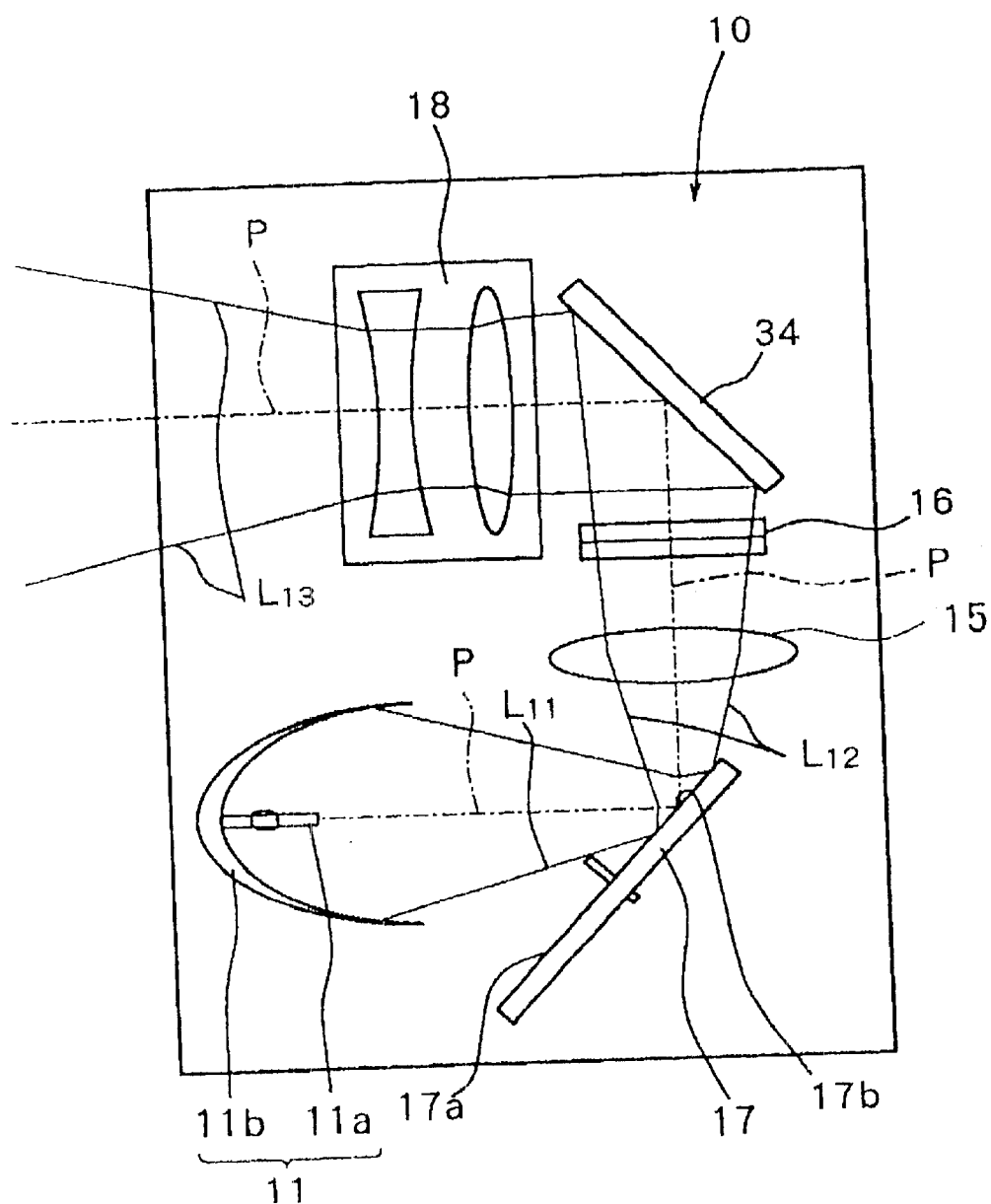
FIG. 16 is a schematic side view for explaining an 11th embodiment of an image projector of the present invention.

FIG. 16 shows an 11th embodiment of the image projector 10. In this case, the reflection type color wheel 17 is also used as the reflection mirror 33 of the white light source 2 side of the image projector 1 of the prior art shown in FIG. 20 explained subsequently so as to eliminate the reflection mirror 33 and thereby reduce costs by the reduction of the number of parts and the assembly work and reduce the overall weight of the image projector 10.

Figure 20:
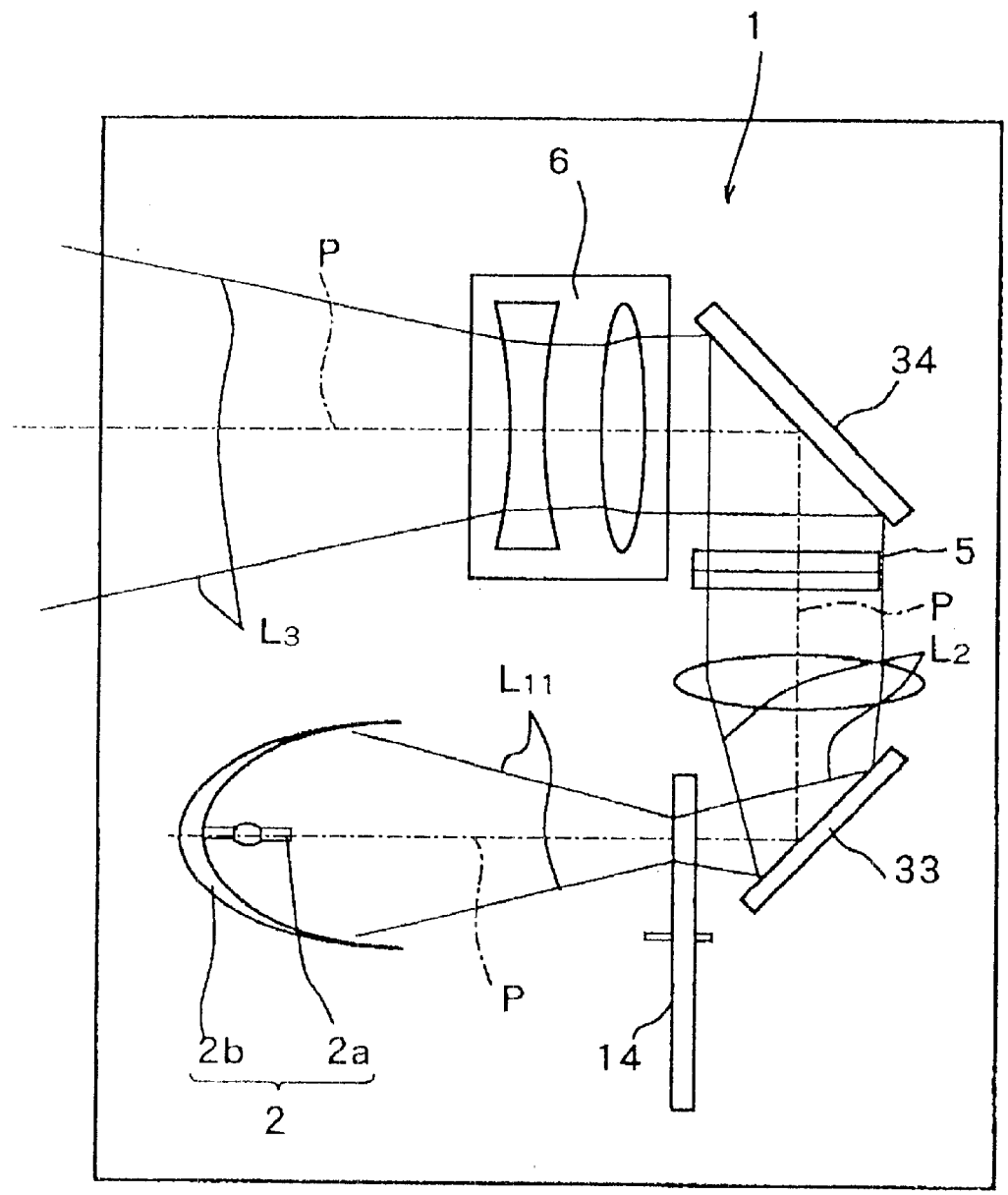
FIG. 20 is a schematic plane view for explaining an example of using a plurality of mirrors to bend an optical axis a plurality of times.
Figure 23:
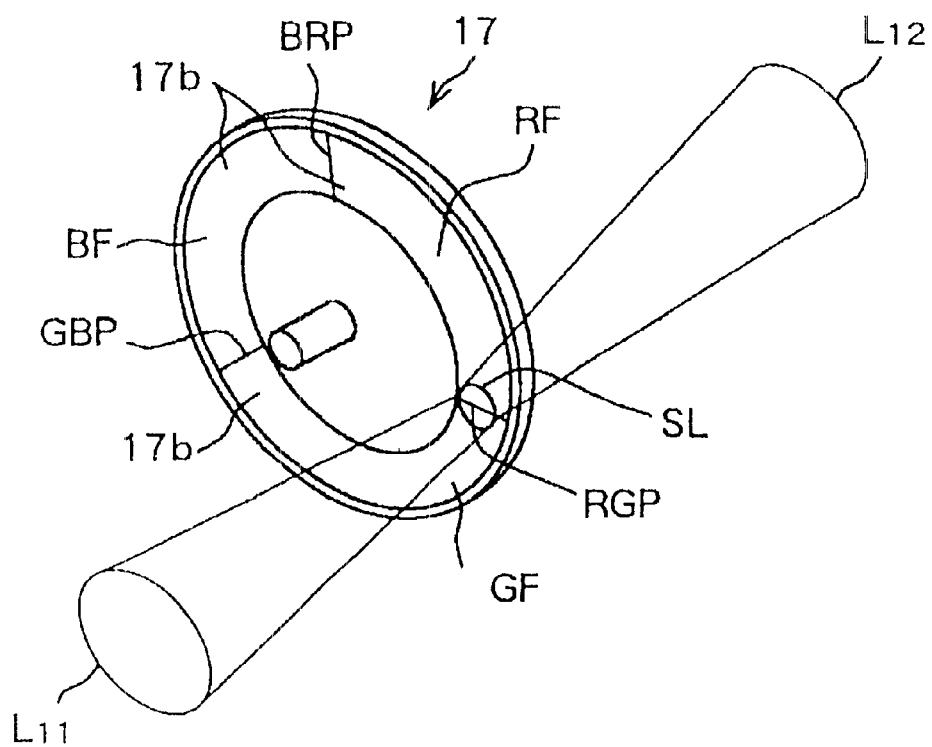
FIG. 23 is a perspective view for explaining an spot of light striking and passing through a transmission type color wheel.

That is, as shown in FIG. 20, in the past, in this type of image projector 1, when the location of the white light source 2 within the projector was limited, sometimes the white light L11 emitted from a white light source 2 along the optical axis P was split into the three or four R, G, B (W) effective light beams L2 of wavelength bands shifted by time by a transmission type color wheel 4, the optical axes P of the effective light beams L2 were bent several times using a plurality of reflection mirrors 33, 34 to change the optical paths, the effective light beams L2 were made to strike to the spatial light modulator 5 by the condenser lens 3 during that interval and were modulated to R, G, B (W) optical images L3 of wavelength bands shifted in time at the spatial light modulator 5, and then the modulated optical images L3 were projected a screen (not shown) so as thereby to make the image projector 1 more compact. In this case, however, a plurality of reflection mirrors 33, 34 becomes necessary and therefore the number of parts and assembly work are increased and the costs made higher. In comparison with this, according to the 11th embodiment of the image projector 10 shown in FIG. 16, the reflection mirror 33 can be eliminated.

12th Embodiment

Figure 17:
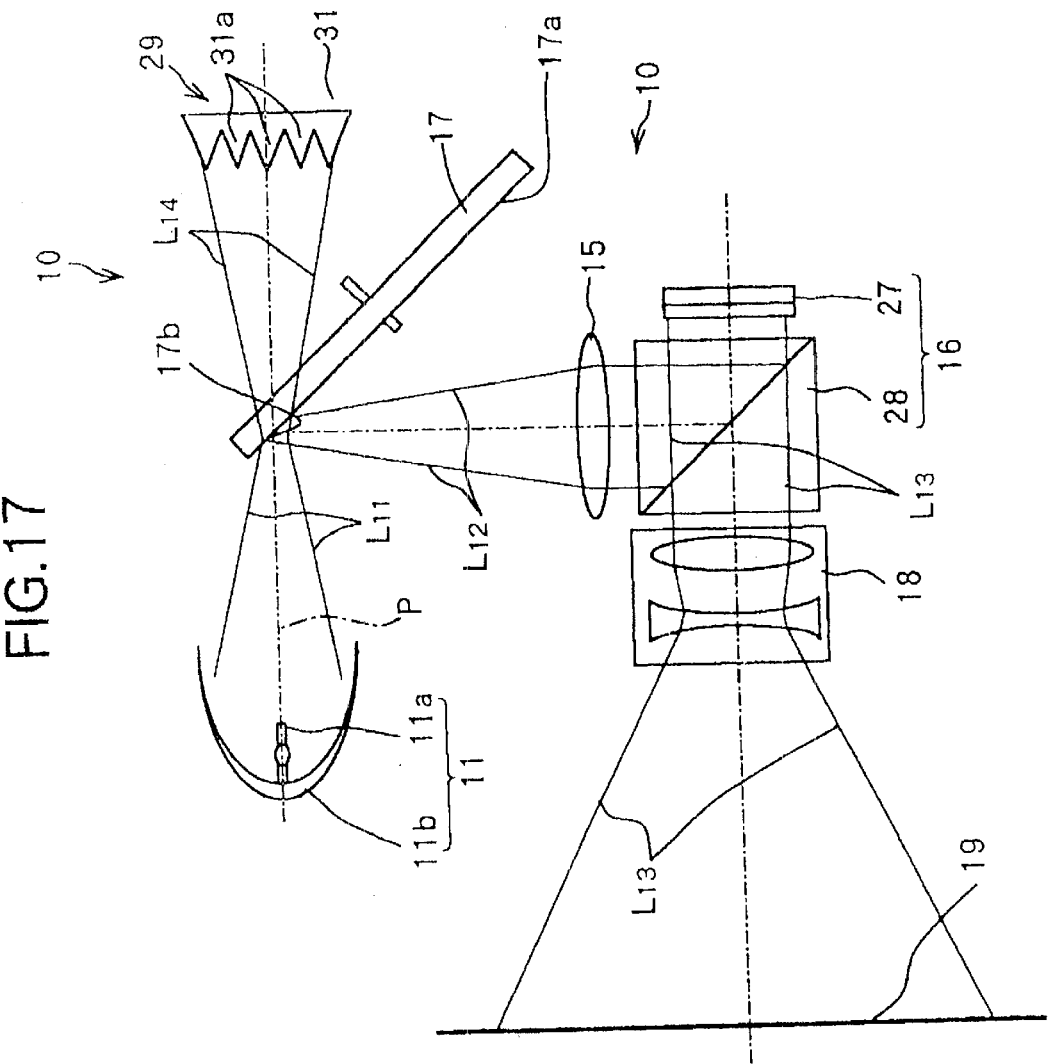
FIG. 17 is a schematic side view for explaining a 12th embodiment of an image projector of the present invention.

FIG. 17 shows a 12th embodiment of the image projector 10. In this case, a reflection type liquid crystal panel 27 is used as the spatial light modulator 16 of the seventh to 10th embodiments. A polarizing beam splitter 28 is arranged at the incident side of the reflection type liquid crystal panel 27. The three or four R, G, B (W) effective light beams L12 of wavelength bands shifted by time split by the reflection type color wheel 17 are reflected 90 degrees by the polarizing beam splitter 28 to strike the reflection type liquid crystal panel 27. The three or four R, G, B (W) optical images L13 (and white light for improvement of luminance) of wavelength bands shifted by time modulated by the reflection type liquid crystal panel 27 are passed through the polarizing beam splitter 28 and projected on the screen 19 etc. by the projection lens 18.

13th Embodiment

Figure 18:
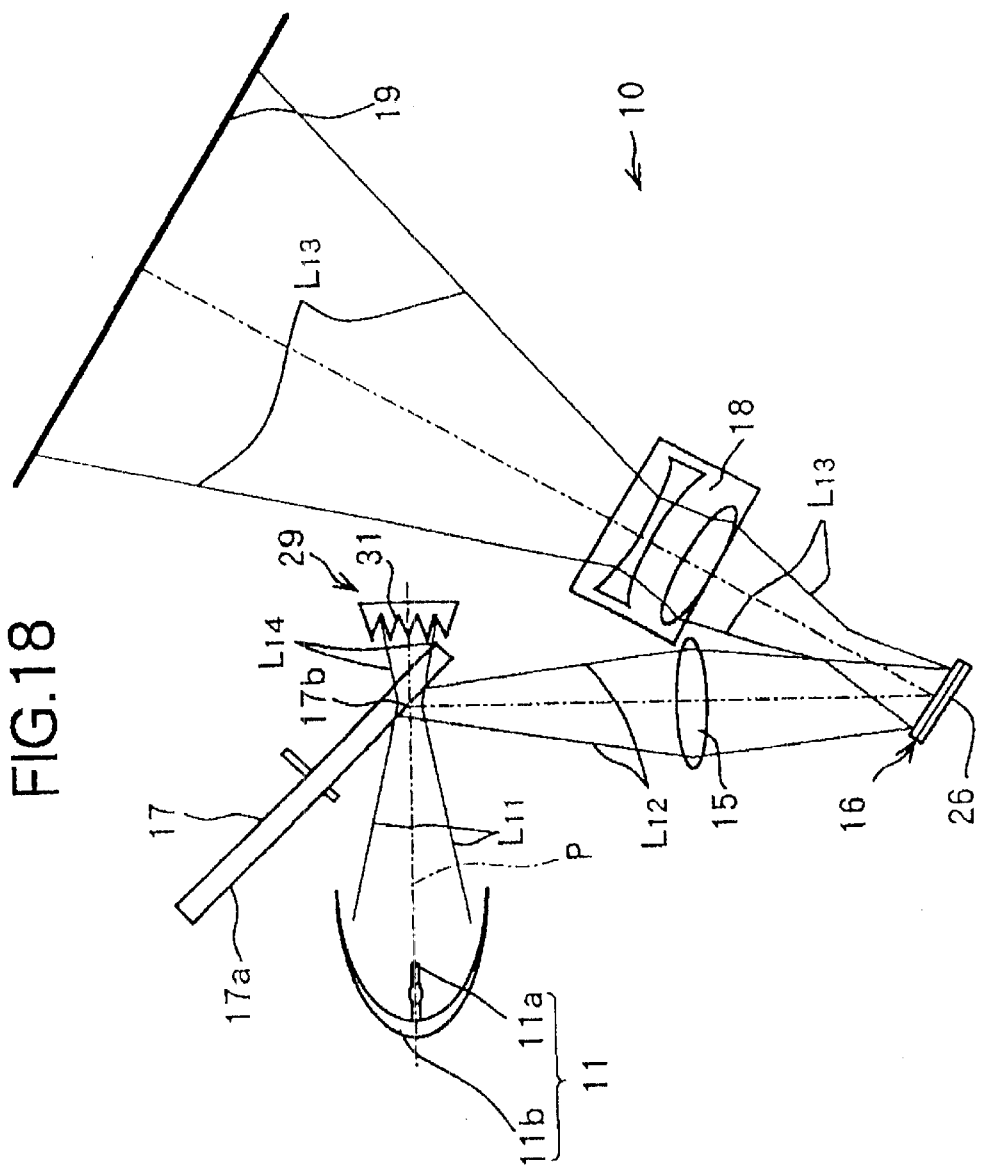
FIG. 18 is a schematic side view for explaining a 13th embodiment of an image projector of the present invention.

FIG. 18 shows a 13th embodiment of the image projector 10. In this case, a DMD 26 is used as the spatial light modulator 16 of the seventh to 10th embodiments. The three or four effective light beams L12 split by the reflection type color wheel 17 strike to the DMD 26 at an angle. The three or four R, G, B (W) optical images (and white light for improvement of luminance) of wavelength bands shifted by time modulated and emitted at an angle by the DMD 26 are projected on the screen 19 etc. by the projection lens 18.

In the image projectors according to these latter embodiments, since a reflection type color wheel is used to split and reflect the white light emitted from the light source into effective light beams of wavelength bands shifted by time, the effective light beams are guided to the spatial light modulator without returning to the light source, provision is made of a means for processing and/or using the unwanted light passing through the reflection type color wheel, the color filters of the transmission type color wheel can be prevented from being heated and damaged by the absorption of light, and the means for processing and/or using the unwanted light passing through the reflection type color wheel can be used to convert light to power by a solar cell etc. and dissipate the heat, it is possible to reduce power consumption by using the power obtained by the photoelectric conversion to meet some of the power requirements of the image projector, it is possible to more efficiently and easily cool the light source and the inside of the image projector due to the dispersion of the heat sources through the dissipation of heat of the unwanted light, and therefore it is possible to improve the reliability of the image projector and prevent noise due to use of a large cooling fan.

Further, in the image projectors according to the above embodiments, since a reflection type color wheel is used to split and reflect the white light emitted from the light source into effective light beams of wavelength bands shifted by time, the effective light beams are guided to the spatial light modulator without returning to the light source, and the reflection type color wheel is also used as an optical path changing means, the reflection mirror etc. for changing the optical path can be eliminated and therefore the costs can be reduced by reduction of the number of the parts and the assembling work and the image projector can be made smaller in size and lighter in weight.

Modifications

Figure 19:
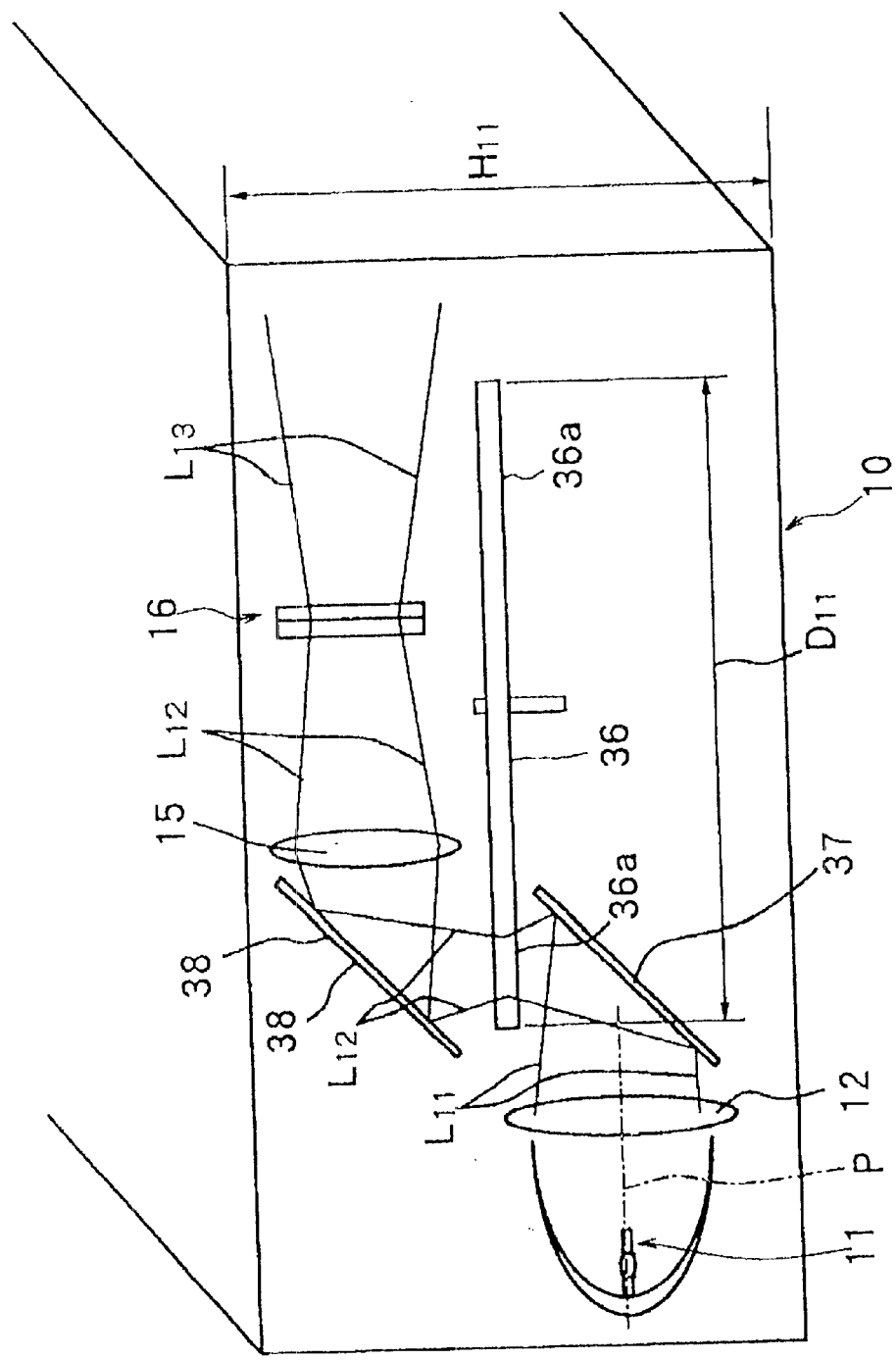
FIG. 19 is a schematic side view for explaining an example of a modification of an image projector of the present invention.
Figure 25:
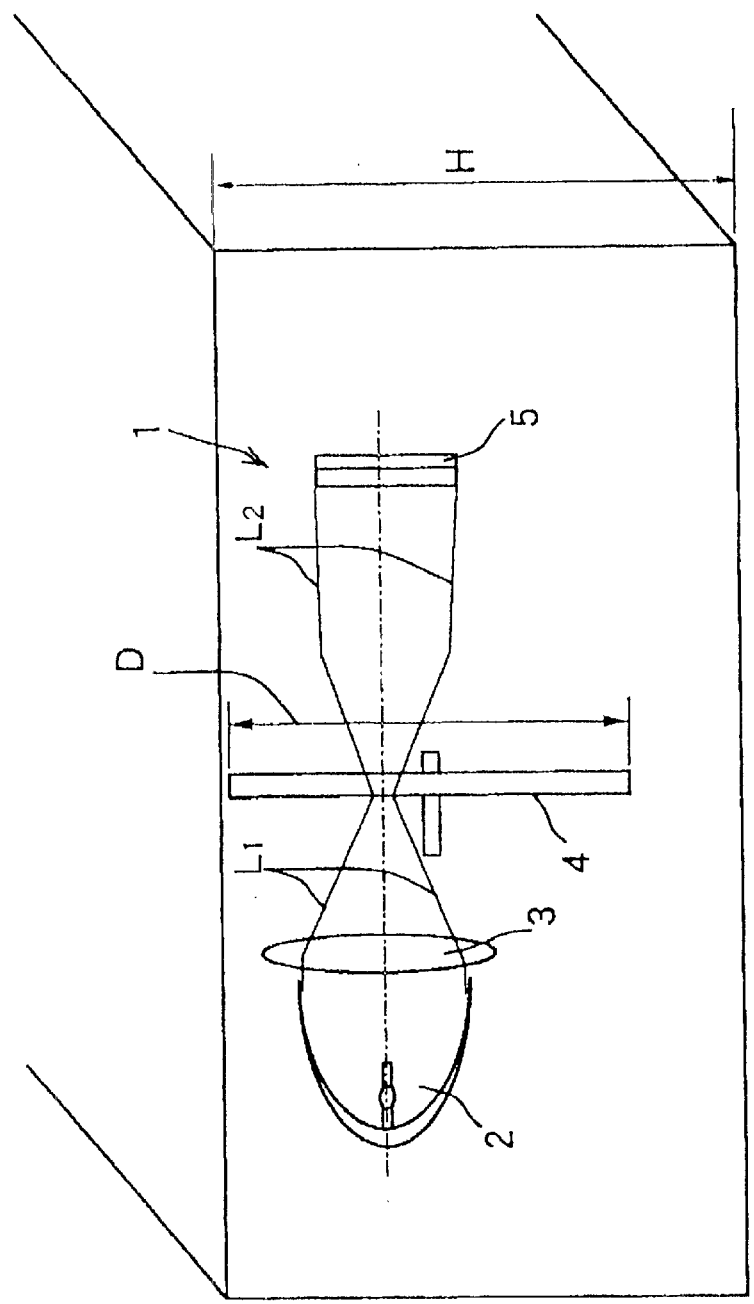
FIG. 25 is a schematic perspective view for explaining a relationship between an overall height of a conventional image projector and a diameter of a transmission type color wheel.
Figure 26:
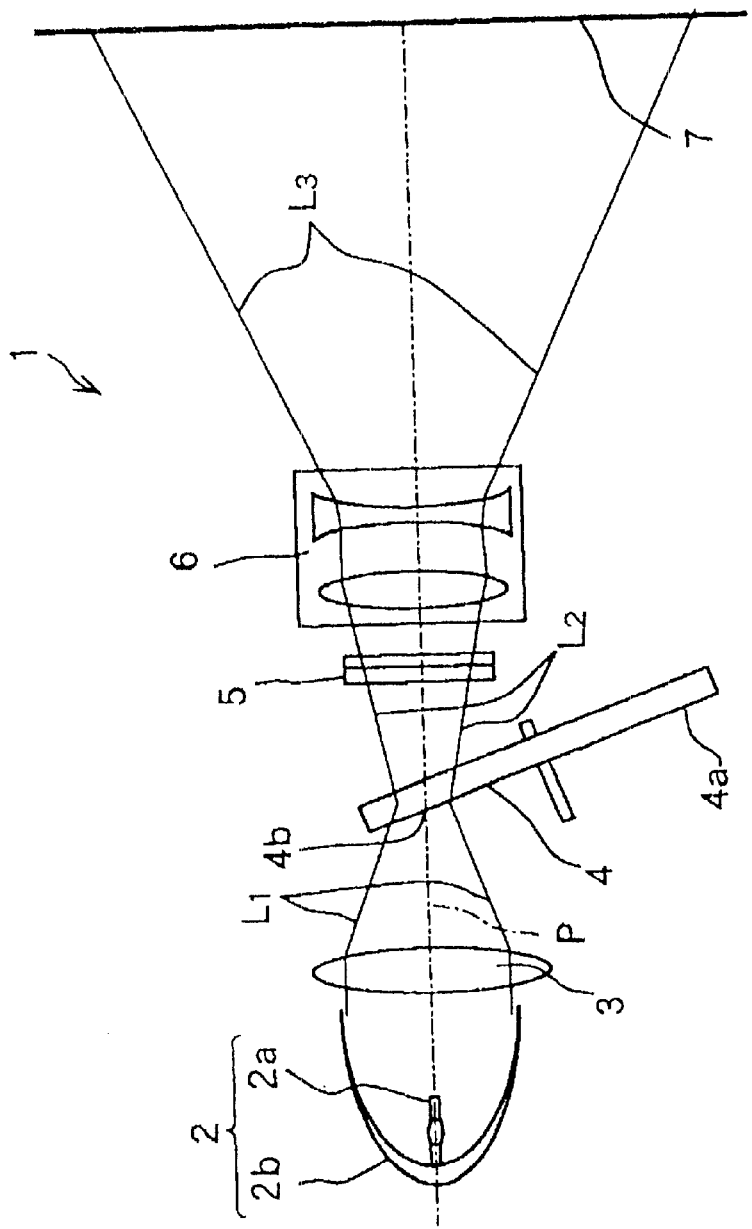
FIG. 26 is a schematic side view for explaining an example of tilting a transmission type color wheel of a conventional image projector with respect to an optical axis.

FIG. 19 shows a modification of the image projector 10. That is, in the conventional image projector shown in FIG. 25, since the transmission type color wheel 4 was arranged at a right angle with respect to the optical axis P of the white light L1 emitted horizontally from the white light source 2, the diameter D of the transmission type color wheel 4 directly influenced the overall height of the image projector 1. Consequently, when trying to reduce the height H, the diameter D of the transmission type color wheel 4 had to be reduced. In this modification of the image projector 10, the transmission type color wheel 36 is arranged horizontally approximately parallel with the horizontal optical axis P of the white light L11 (the wheel surface 36a of the transmission type color wheel 36 being approximately parallel with the optical axis P), and the white light source 11 and the spatial light modulator 16 are arranged at two levels above and below the transmission type color wheel 36.

Further, in this case, the white light L11 horizontally emitted from the white light source 11 passes through the first condenser lens 12 and is bent perpendicularly upward 90 degrees by the reflection type mirror 37 to strike the transmission type color wheel 36. The split three or four R, G, B (W) effective light beams L12 of wavelength bands shifted by time pass in the upper direction (or lower direction) through the transmission type color wheel 36. The transmitted effective light beams L12 are bent 90 degrees again by the second reflection mirror 38 to be horizontal approximately parallel with the optical axis P and passes through the second condenser lens 12 to strike the spatial light modulator 16.

For this reason, according to this modification of the image projector 10, by arranging the white light source 11 and the spatial light modulator 16 in two levels above and below the horizontally arranged reflection type color wheel 36, while the overall height H11 of the image projector 10 is limited to some degree, it becomes possible to increase the diameter D11 of the transmission type color wheel 36 remarkably in comparison with conventional case. By increasing the diameter D11 of the transmission type color wheel 36, it becomes to be possible to shorten the time T for turning off the spatial light modulator 16 while supplying the spatial light modulator 16 with the image signals SR, SG, SB as explained in FIG. 24 and to improve the luminance of the optical images projected to the screen 19 etc.

While the invention has been described with reference to specific embodiment chosen for purpose of illustration, it should be apparent that numerous modifications could be made thereto by those skilled in the art without departing from the basic concept and scope of the invention.

What is claimed is:

1. An image projector, comprising
a light source emitting white light;
a color wheel for receiving white light emitted from said light source and generating light beams of different wavelength bands at different times;
a spatial light modulator for receiving the light beams of different wavelength bands at the different times emitted by said color wheel and supplying image signals corresponding to the wavelength bands of the light beams to modulate the received light beams to optical images of different wavelength bands at the different times; and
a projection lens for projecting said optical images modulated by said spatial light modulator,
wherein said color wheel is comprised as a reflection type color wheel which receives said white light emitted from said light source to reflect so as to generate the light beams of different wavelength bands at the different times and directs the same to said spatial light modulator, and
wherein said color wheel is arranged so as to be approximately parallel to a light path.

2. An image projector as set forth in claim 1, wherein said reflection type color wheel comprises rotatable dichroio mirrors and generates the light beams substantially used for the projection.

3. An image projector as set forth in claim 1, wherein said spatial light modulator comprises a liquid crystal material.

4. An image projector as set forth in claim 1, wherein said spatial light modulator comprises a transmission type modulator which transmits the modulated optical images for output.

5. An image projector as set forth in claim 1, wherein said spatial light modulator comprises as a reflection type modulator which reflects the modulated optical images for output.

6. An image projector as set forth in claim 5, wherein each pixel of the reflection type spatial light modulator comprises a micro-mirror.

7. An image projector, comprising
a light source emitting white light;
a color wheel for receiving white light emitted from said light source and generating light beams of different wavelength bands at different times;
a spatial light modulator for receiving light beams of different wavelength bands at the different times emitted by said color wheel and supplying image signals corresponding to the wavelength bands of the light beams to modulate the received light beams to optical images of different wavelength bands at the different times; and
a projection lens for projecting said optical images modulated by said spatial light modulator, wherein
said color wheel is comprised as a reflection type color wheel which receives said white light emitted from said light source to reflect so as to generate the light beams of different wavelength bands at the different times and directs the same to said spatial light modulator,
said reflection type color wheel is arranged approximately parallel with an optical axis of white light emitted from said light source and/or light beams striking said spatial light modulator, and
an optical path changing means is provided for making said white light strike said reflection type color wheel at an angle and/or making said light beams reflected at an angle from said reflection type color wheel strike the spatial light modulator.

8. An image projector as set forth in claim 7, wherein said reflection type color wheel comprises rotatable dichroic mirrors and generates the light beams substantially used for the projection.

9. An image projector as set forth in claim 7, wherein said spatial light modulator comprises a liquid crystal material.

10. An image projector as set forth in claim 7, wherein said spatial light modulator comprises a transmission type modulator which transmits the modulated optical images for output.

11. An image projector as set forth in claim 7, wherein said spatial light modulator comprises a reflection type modulator which reflects the modulated optical images for output.

12. An image projector as set forth in claim 11, wherein each pixel of the reflection type spatial light modulator comprises a micro-mirror.

13. An image projector, comprising
a light source emitting white light;
a color wheel for receiving white light emitted from said light source into light beams of different wavelength bands at different times;
a spatial light modulator for receiving light beams of different wavelength bands at the different times emitted by said color wheel and supplying image signals corresponding to wavelength bands of the light beams to modulate the received light beams to optical images of different wavelength bands at the different times; and
a projection lens for projecting said optical images modulated by said spatial light modulator, and
a means for processing and/or using unwanted light transmitted through said reflection type color wheel is further provided
wherein said color wheel is comprised as a reflection type color wheel which receives said white light emitted from said light source into light beams of different wavelength bands at the different times and directs the same to said spatial light modulator, and
wherein said color wheel is arranged so as to be approximately parallel to a light path.

14. An image projector, comprising
a light source emitting white light;
a color wheel for receiving white light emitted from said light source into light beams of different wavelength bands at different times;
a spatial light modulator for receiving light beams of different wavelength bands at the different times emitted by said color wheel and supplying image signals corresponding to wavelength bands of the light beams to modulate the received light beams to optical images of different wavelength bands at the different times; and
a projection lens for projecting said optical images modulated by said spatial light modulator,
wherein said color wheel is comprised as a reflection type color wheel which receives said white light emitted from said light source into light beams of different wavelength bands at the different times and directs the same to said spatial light modulator, and
a means for processing and/or using unwanted light transmitted through said reflection type color wheel is further provided,
wherein said means for processing and/or using unwanted light transmitted through said reflection type color wheel is a solar battery.

15. An image projector, comprising
a light source emitting white light;
a color wheel for receiving white light emitted from said light source into light beams of different wavelength bands at different times;
a spatial light modulator for receiving light beams of different wavelength bands at the different times emitted by said color wheel and supplying image signals corresponding to wavelength bands of the light beams to modulate the received light beams to optical images of different wavelength bands at the different times; and
a projection lens for projecting said optical images modulated by said spatial light modulator,
wherein said color wheel is comprised as a reflection type color wheel which receives said white light emitted from said light source into light beams of different wavelength bands at the different times and directs the same to said spatial light modulator, and
a means for processing and/or using unwanted light transmitted through said reflection type color wheel is further provided,
wherein said means for processing and/or using unwanted light transmitted through said reflection type color wheel is a heat sink.

16. An image projector as set forth in claim 13, wherein said reflection type color wheel comprises rotatable dichroic mirrors and generates the light beams substantially used for the projection.

17. An image projector, comprising
a light source emitting white light;
a color wheel for receiving white light emitted from said light source into light beams of different wavelength bands at different times;
a spatial light modulator for receiving light beams of wavelength bands at the different times emitted by said color wheel and supplying image signals corresponding to wavelength bands of the light beams to modulate the received light beams to optical images of different wavelength bands at the different times; and
a projection lens for projecting said optical images modulated by said spatial light modulator,
wherein said color wheel is comprised as a reflection type color wheel which receives said white light emitted from said light source into light beams of different wavelength bands at the different times time and directs the same to said spatial light modulator,
wherein said color wheel is arranged so as to be approximately parallel to a light path, and
wherein said reflection type color wheel is also used as an optical path changing means.

18. An image projector as set forth in claim 17, wherein said reflection type color wheel comprises rotatable dichroic mirrors and generates the light beams substantially used for the projection.

19. An image projector as set forth in claim 17, wherein said spatial light modulator comprises a transmission type modulator which transmits the modulated optical images for output.

20. An image projector as set forth in claim 17, wherein said spatial light modulator comprises a reflection type modulator which reflects the modulated optical images for output.

* * * * *